United States Patent
Nakagawa

(10) Patent No.: US 8,994,844 B2
(45) Date of Patent: Mar. 31, 2015

(54) IMAGE PROCESSING APPARATUS THAT SYNTHESIZES ACQUIRED IMAGES TO GENERATE SUCCESSIVE IMAGES, CONTROL METHOD THEREFOR, AND IMAGE PICKUP APPARATUS

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/290,622

(22) Filed: Nov. 7, 2011

(65) Prior Publication Data
US 2012/0120272 A1 May 17, 2012

(30) Foreign Application Priority Data
Nov. 11, 2010 (JP) .................................. 2010-252864

(51) Int. Cl.
*H04N 5/228* (2006.01)
*H04N 5/232* (2006.01)
*H04N 101/00* (2006.01)

(52) U.S. Cl.
CPC ....... *H04N 5/23232* (2013.01); *H04N 5/23293* (2013.01); *H04N 2101/00* (2013.01)
USPC .................................................... 348/222.1

(58) Field of Classification Search
CPC .............. H04N 5/232; H04N 5/23248; H04N 5/23287; H04N 5/2351; H04N 5/2353; H04N 9/045
USPC ................. 348/208.12, 208.16, 220.1, 221.1, 348/222.1, 333.01, 362, 399.1, 575
See application file for complete search history.

(56) References Cited

U.S. PATENT DOCUMENTS

| | | | |
|---|---|---|---|
| 6,778,210 B1* | 8/2004 | Sugahara et al. | 348/208.4 |
| 7,057,645 B1* | 6/2006 | Hara et al. | 348/208.6 |
| 7,386,228 B2* | 6/2008 | Okada | 396/238 |
| 7,546,026 B2* | 6/2009 | Pertsel et al. | 396/52 |
| 2004/0145673 A1* | 7/2004 | Washisu | 348/364 |
| 2010/0073516 A1* | 3/2010 | Minakuti et al. | 348/229.1 |
| 2011/0188744 A1* | 8/2011 | Sun | 382/162 |
| 2012/0257077 A1* | 10/2012 | Suzuki | 348/222.1 |

FOREIGN PATENT DOCUMENTS

JP 2008-079222 * 4/2008

* cited by examiner

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An image processing apparatus that can reduce the area where acquired images are held and reduce the load in image synthesis when successive images are to be generated. Acquired images are sequentially acquired and held in an acquired image storage circuit. A first set number of acquired images among the acquired images are synthesized to generate first composite images. The first composite images are held in a grouped image storage circuit. Second composite images from an image generated last to an image corresponding to a second set number among the first composite images are synthesized to generate a second composite image. The acquired images used to generate the first composite images are sequentially deleted.

13 Claims, 17 Drawing Sheets

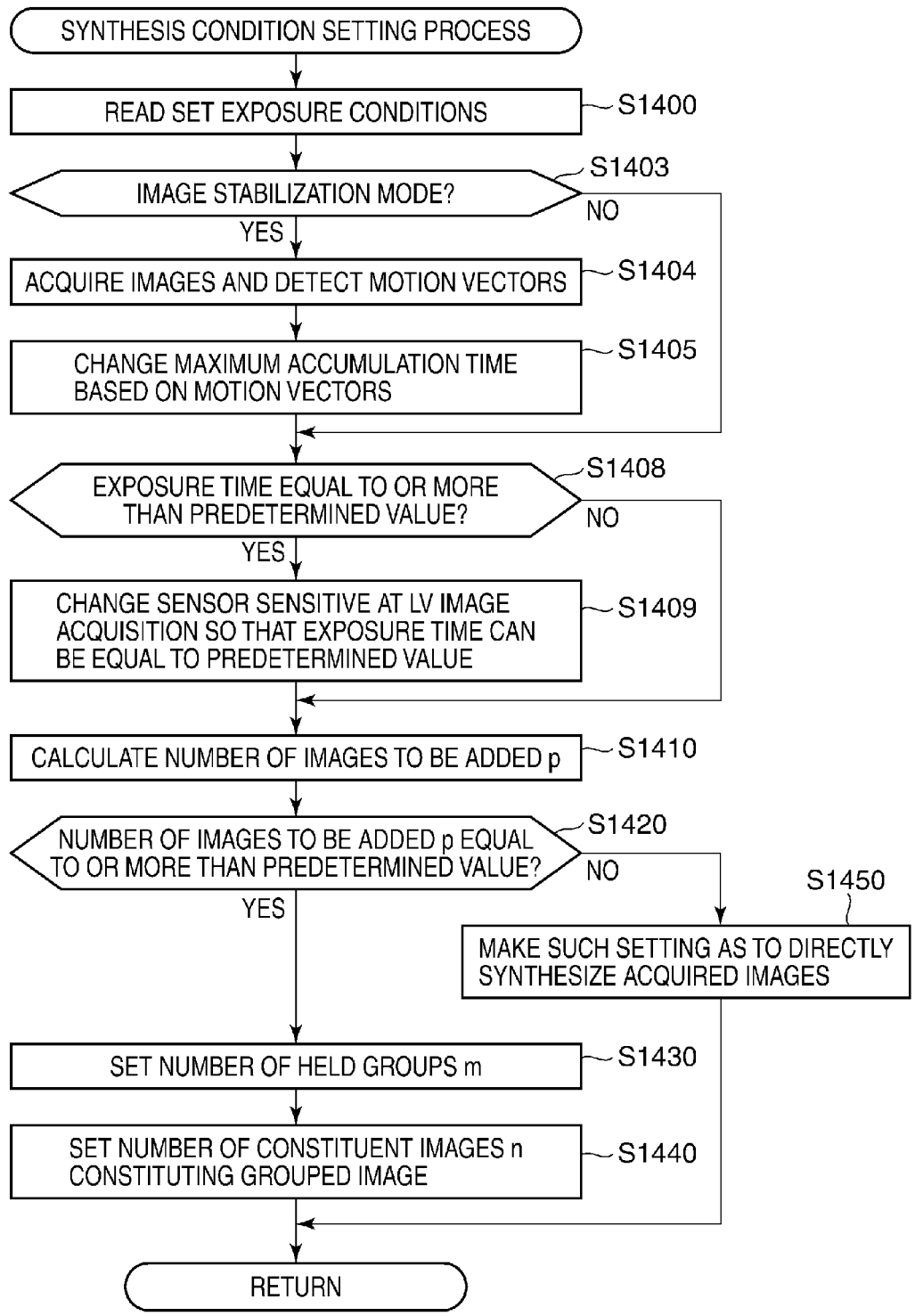

IMAGE PROCESSING APPARATUS THAT SYNTHESIZES ACQUIRED IMAGES TO GENERATE SUCCESSIVE IMAGES, CONTROL METHOD THEREFOR, AND IMAGE PICKUP APPARATUS

BACKGROUND OF THE INVENTION

1. Field of the Invention

The present invention relates to an image processing apparatus that synthesizes acquired images to generate successive images, a control method therefor, and an image pickup apparatus.

2. Description of the Related Art

Conventionally, some image processing apparatuses in image pickup apparatuses or the like are configured to be capable of live view displays to successively display images acquired by an image pickup unit. In particular, there is known an image pickup apparatus capable of exposure simulation displays to display images based on an exposure setting value for shooting set in the image pickup apparatus.

Also, as described in Japanese Laid-Open Patent Publication (Kokai) No. 2008-079222, a plurality of images are acquired at regular intervals and held in a storage means, and in accordance with a set shutter speed, a predetermined number of images from the latest image being held are synthesized and displayed as a through image.

However, in the conventional apparatus capable of live view displays, when exposure simulation displays which display images with shooting exposure are produced, it is necessary to produce displays at a predetermined frame rate even at low brightness considering the following capability of images. At low brightness, however, exposure amount for a time period corresponding to the actual exposure value cannot be secured, and hence underexposed images may be displayed at exposure values different from the actual exposure values.

In apparatuses in which a plurality of images acquired at predetermined intervals are synthesized and displayed such as the one described in Japanese Laid-Open Patent Publication (Kokai) No. 2008-079222, for example, it is necessary to reserve storage space for storing images of 50 frames so as to acquire 10 frames per second and synthesize images of 5 seconds. Thus, when the number of frames to be synthesized increases, reserving memory capacity (storage space) for storing them becomes difficult, and there is a heavy computation load in image synthesis due to the need for synthesizing a number of images every time the composite image is updated.

SUMMARY OF THE INVENTION

The present invention provides an image processing apparatus that can reduce the area where acquired images are held and reduce the load in image synthesis when successive images are to be generated, a control method therefor, and an image pickup apparatus.

Accordingly, a first aspect of the present invention provides an image processing apparatus comprising a first holding unit configured to hold acquired images that are sequentially acquired, a first synthesis unit configured to synthesize a first set number of acquired images among the acquired images held in the first holding unit to generate first composite images, a second holding unit configured to hold the first composite images, a second synthesis unit configured to synthesize images from an image generated last to an image corresponding to a second set number among the first composite images held in the second holding unit to generate a second composite image, and an deleting unit configured to sequentially delete the acquired images used to generate the first composite images.

Accordingly, a second aspect of the present invention provides an image pickup apparatus comprising an image processing apparatus according to claim 2, and an image pickup unit configured to acquire acquired images to be held in the first holding unit of the image processing apparatus, wherein a display unit of the image processing apparatus sequentially displays the second composite images generated by the second synthesis unit as live views.

Accordingly, a third aspect of the present invention provides an image pickup apparatus comprising an image processing apparatus according to claim 2, and an image pickup unit configured to acquire acquired images to be held in the first holding unit of the image processing apparatus, wherein the second composite images generated by the second synthesis unit of the image processing apparatus are moving images in a storage device.

Accordingly, a fourth aspect of the present invention provides a control method for an image processing apparatus having a first holding unit configured to hold acquired images, a synthesis unit configured to synthesize a plurality of acquired images to generate first composite images, comprising a first holding step of storing, in the holding unit, acquired images there are sequentially acquired, a first synthesis step in which the synthesis unit generates first composite images by synthesizing the first set number of the acquired images among the acquired images held in the first holding step, a second holding step of holding the first composite images in the holding unit, a second synthesis step of synthesizing images from an image generated last to an image corresponding to a second set number among the first composite images held in the second holding step to generate a second composite image, and a deleting step of sequentially deleting the acquired images that have been used to generate the first composite images.

According to the present invention, when successive images are to be generated, the area where acquired images are held can be reduced, and the load in image synthesis can be reduced.

Further features of the present invention will become apparent from the following description of exemplary embodiments (with reference to the attached drawings).

BRIEF DESCRIPTION OF THE DRAWINGS

FIG. 5 is a flowchart of a synthesis condition setting process carried out in step S101 in FIG. 4A.

DESCRIPTION OF THE EMBODIMENTS

The present invention will now be described in detail with reference to the drawings showing embodiments thereof.

Figure 1:
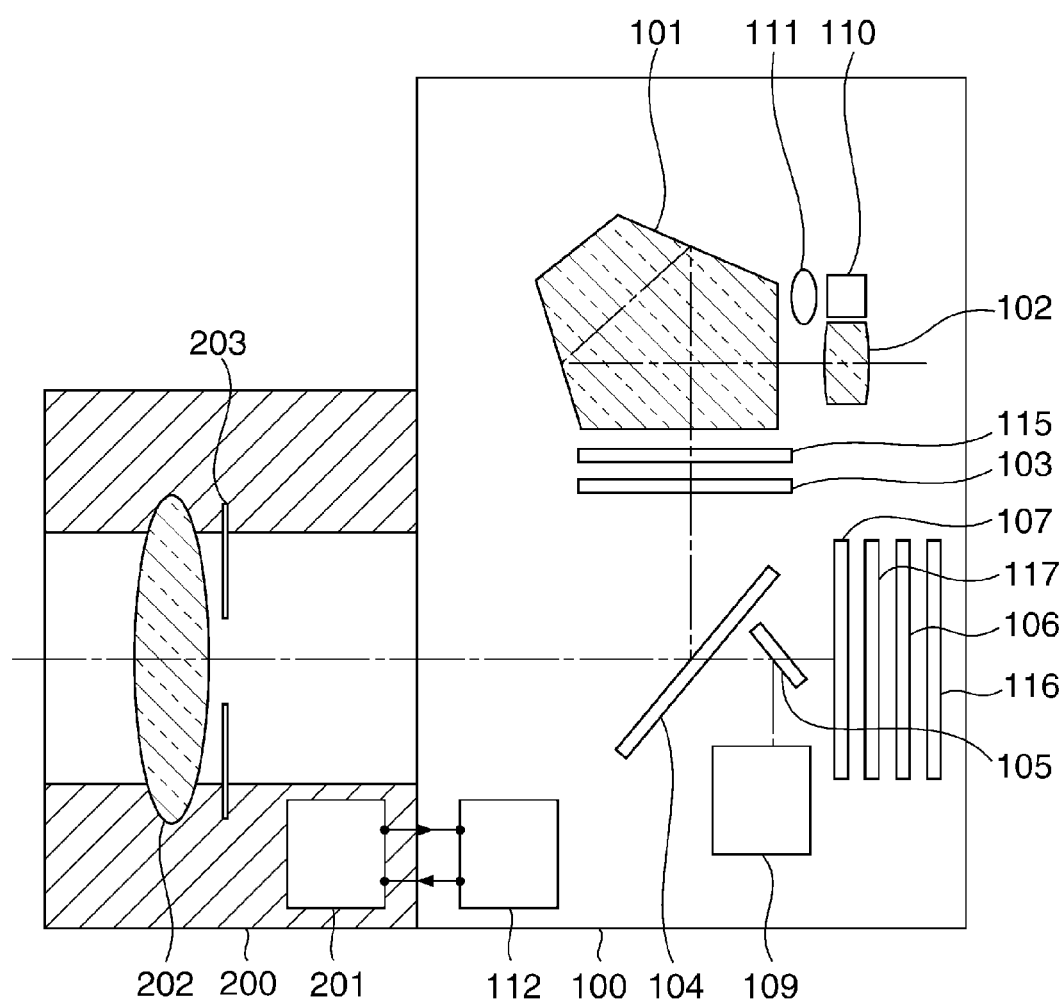
FIG. 1 is a diagram schematically showing an arrangement of an image pickup apparatus to which an image processing apparatus according to a first embodiment of the present invention is applied.

FIG. 1 is a diagram schematically showing an arrangement of an image pickup apparatus to which an image processing apparatus according to a first embodiment of the present invention is applied. The image pickup apparatus is configured as a single-lens reflex camera capable of live view displays. The image pickup apparatus is comprised of an image pickup apparatus main body 100, and an interchangeable lens 200 removably mounted on the image pickup apparatus main body 100.

The image pickup apparatus main body 100 has an erected normal image optical system 101, an eye lens 102, and a finder screen 103 constituting a finder optical system. A main half mirror 104 deflects a pencil of image pickup light to the finder optical system. A sub mirror 105 deflects a pencil of image pickup light to a focus detecting unit 109, to be described later. The main half mirror 104 and the sub mirror 105 constitute a light path dividing optical system. An image pickup device 106 is comprised of a CCD sensor, a CMOS sensor, or the like. A focal plane shutter (hereafter referred to as the shutter unit) 107 which is a mechanical shutter controls exposure of the image pickup device 106.

The focus detecting unit 109 has at least a pair of pixel rows (line sensors), which carries out photoelectric conversion on a pair of images formed by a pencil of light from an image pickup optical system to output a signal. A photometric measurement sensor 110 measures subject brightness, and a photometric measurement lens 111 forms a pencil of light from a subject on the photometric measurement sensor 110.

A camera microprocessor (a first setting unit, a second setting unit, a first synthesizing unit, a second synthesizing unit, and an deleting unit) 112 is responsible for controlling various operations of the image pickup unit main body 100. Although there is one camera microprocessor 112, there may be a plurality of camera microprocessor 112 to disperse control load. A finder display unit 115 displays various information for a user who peeps through an optical finder. An external display unit 116 is provided on an outer surface of the image pickup unit main body 100, and acts as an electronic viewfinder (EVF). A low-pass filter 117 is disposed on a front surface of the image pickup device 106.

On the other hand, the interchangeable lens 200 has a lens microprocessor 201 responsible for controlling various operations of the interchangeable lens 200. The lens microprocessor 201 communicates with the camera microprocessor 112 via a communication contact. A lens 202 is an imaging optical system constituting a shooting optical system. A diaphragm unit 203 adjusts an amount of light. Although in FIG. 1, only one lens is illustrated, the shooting optical system is actually comprised of a plurality of lenses.

In the present embodiment, the camera microprocessor 112 of the image pickup unit main body 100 communicates with the lens microprocessor 201 of the interchangeable lens 200, and thus uses information possessed by the interchangeable lens 200 so as to provide control.

Figure 2:
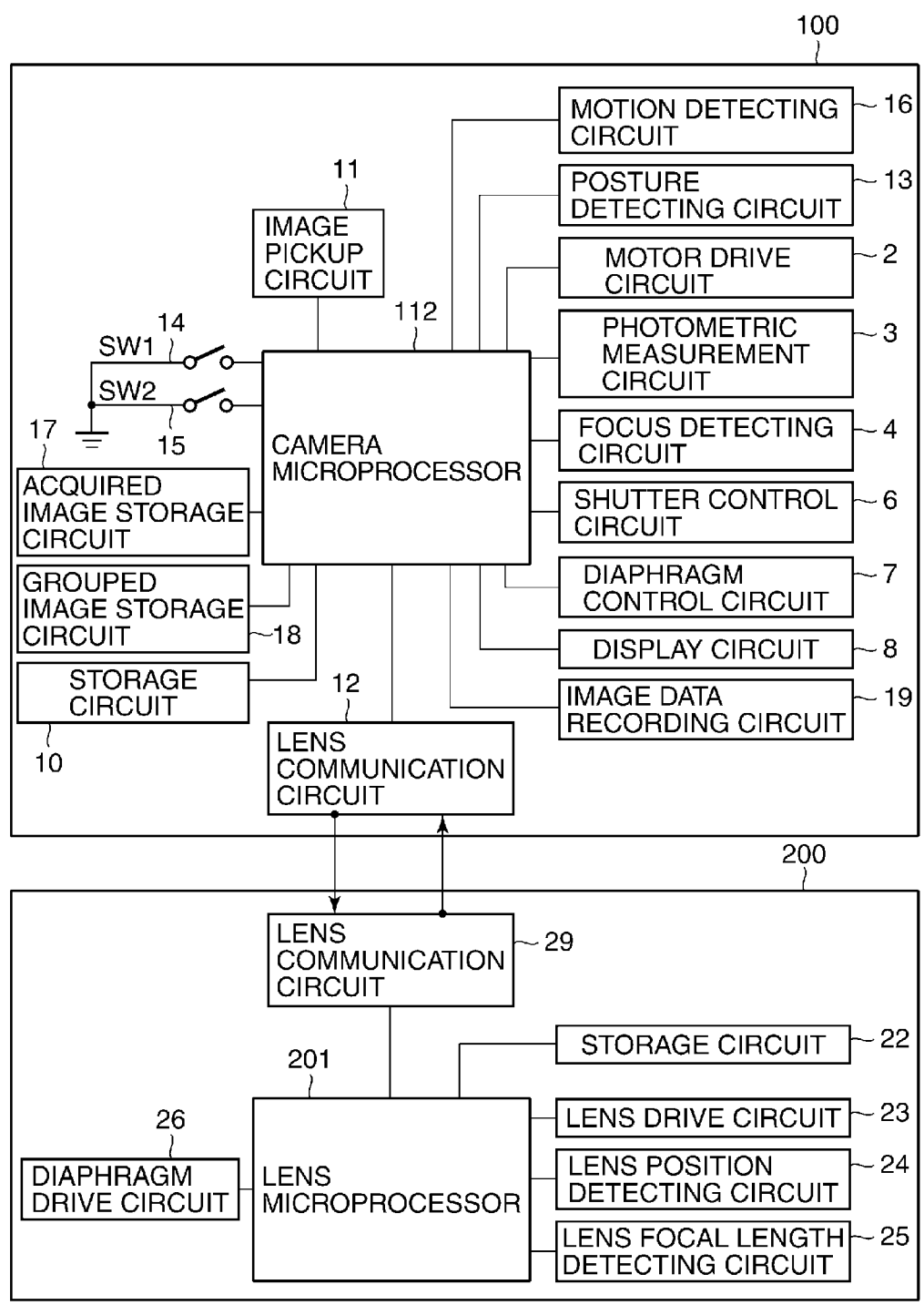
FIG. 2 is a block diagram schematically showing a circuit arrangement of the image pickup apparatus

FIG. 2 is a block diagram schematically showing a circuit arrangement of the image pickup apparatus (the image pickup unit main body 100 and the interchangeable lens 200).

As shown in FIG. 2, the image pickup unit main body 100 has component elements described below as well as the camera microprocessor 112 described above. First, a motor drive circuit 2 drives movable portions of the image pickup unit main body 100. A photometric measurement circuit 3 is a circuit for measuring the brightness of a subject and included in the photometric measurement sensor 110 appearing in FIG. 1. A focus detecting unit 4 is for detecting the focusing state of the interchangeable lens 200 and included in the focus detecting unit 109 appearing in FIG. 1.

A shutter control circuit 6 is a circuit for controlling the exposure amount of the image pickup unit main body 100 and included in the shutter unit 107 appearing in FIG. 1. A diaphragm control circuit 7 is a circuit for controlling pencils of light taken into the image pickup unit main body 100 and controls the diaphragm unit 203 appearing in FIG. 1. A display circuit (display unit) 8 is a circuit for controlling the state of the image pickup unit main body 100 and includes the finder display unit 115 and the external display unit 116 appearing in FIG. 1.

A storage circuit 10 stores information on setting conditions of the image pickup unit main body 100. An image pickup circuit (image pickup unit) 11 carries out image pickup processing. A lens communication circuit 12 communicates with the interchangeable lens 200 mounted on the image pickup unit main body 100. A posture detecting circuit 13 detects changes in the posture of the image pickup unit main body 100. A switch 14 (SW1) is a switch for starting preparations for image pickup, and a switch 15 (SW2) is a switch for starting image pickup.

A motion vector detecting circuit (detecting unit) 16 is a circuit for detecting motion vectors of images acquired by the image pickup device 106 or the image pickup circuit 11. An acquired image storage circuit (first storing unit) 17 temporarily holds images acquired by the image pickup device 106 or the image pickup circuit 11 (hereafter also referred to as "acquired images IP"). A grouped image storage circuit (second storing unit) 18 temporarily holds results (hereafter referred to as "grouped images (first synthesized images) GP") acquired by synthesizing acquired images acquired by the image pickup circuit 11 and held in the acquired image storage circuit 17. An image data recording circuit (storage unit) 19 records image data.

Images acquired by the image pickup circuit 11 are held in the acquired image storage circuit 17 first, and then grouped images GP are generated by synthesis from the acquired images IP held in the acquired image storage circuit 17 and held in the grouped image storage circuit 18. Further, synthesized images to be displayed (hereafter referred to as "display images (second synthesized images) P") are generated from the grouped images GP held in the grouped image storage circuit 18, and they are displayed by the display circuit 8. They are also subjected to processing such as image recording by the image data recording circuit 19.

The interchangeable lens 200 has a storage circuit 22 storing setting values of the interchangeable lens 200, and a lens drive circuit 23 that drives the interchangeable lens 200, as well as the lens microprocessor 201 described above. Further, the interchangeable lens 200 has a lens position detecting circuit 24 that detects the position of the interchangeable lens 200, and a lens focal length detecting circuit 25 that detects the set focal length of the interchangeable lens 200. A diaphragm driver circuit 26 is included in the diaphragm unit 203 appearing in FIG. 1 and drives a diaphragm. A lens communication circuit 29 communicates with the image pickup unit main body 100. The lens communication circuit 29 receives control instructions from the image pickup unit main body 100, and transmits shape information, lens setting values, and so on held in the interchangeable lens 200.

Figure 3:
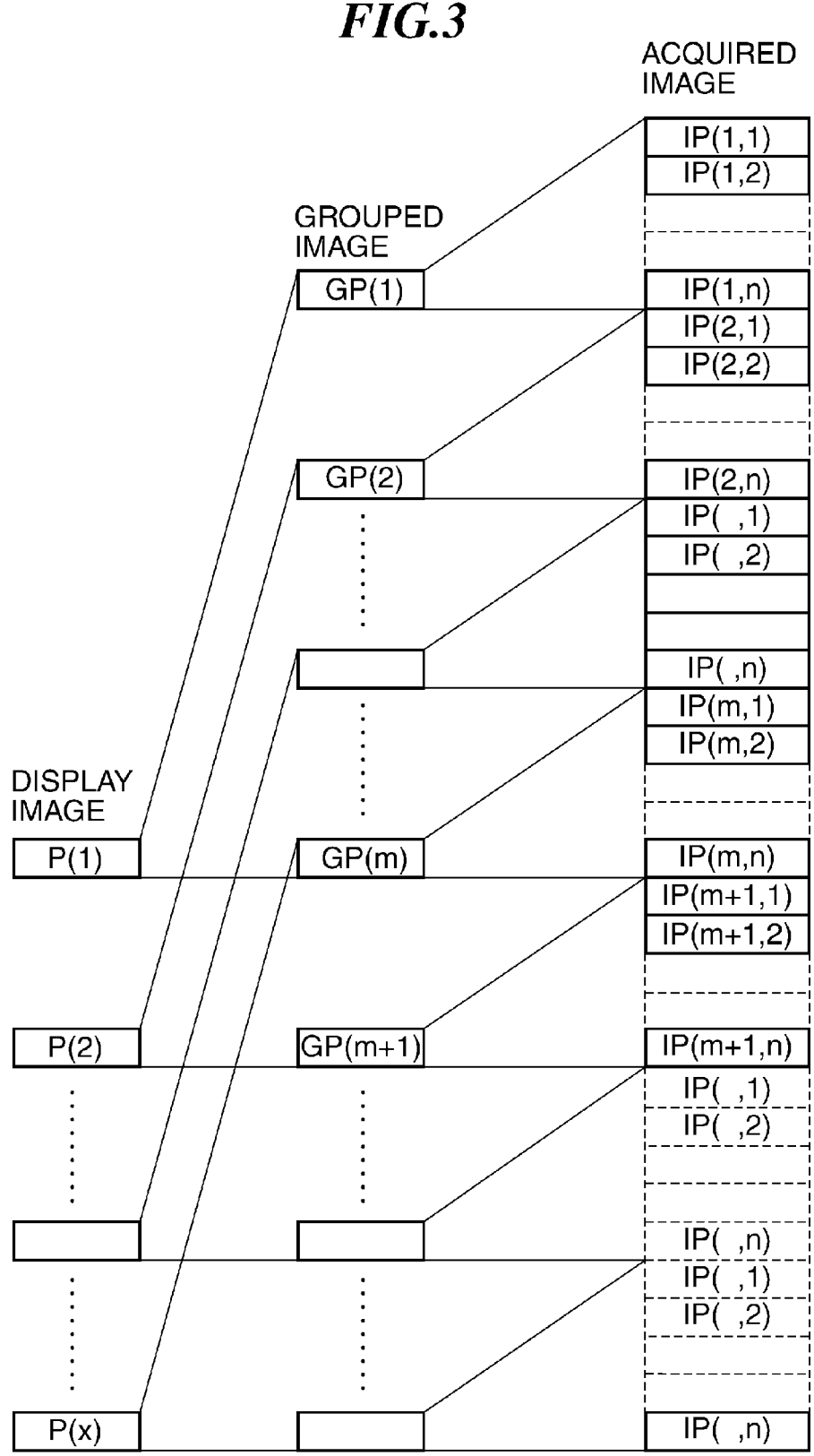
FIG. 3 is a diagram schematically showing how acquired images are synthesized.

FIG. 3 is a diagram schematically showing how acquired images IP are synthesized. Referring to FIG. 3, $n$ acquired images IP acquired by the image pickup circuit 11 are synthesized to generate a grouped image GP, and at the time $m$ grouped images GP are generated, the $m$ grouped images GP are synthesized to generate a display image P. This control is performed by the camera microprocessor 112 (hereafter referred to merely as "the processor 112").

"$n$" is a "first set number", which is the number of acquired images IP to be synthesized so as to generate one grouped image GP, that is, the number of acquired images IP constituting one grouped image GP (hereafter referred to as the "the number of constituent images $n$"). "$m$" is a "second set number", which is the number of grouped images GP to be synthesized so as to generate one display image P (hereafter referred to as "the number of held groups $m$").

As shown in FIG. 3, acquired images IP sequentially acquired are sequentially held in the acquired image storage circuit 17, IP(1, 1), IP(1, 2), . . . IP(1, n). When $n$ acquired images IP have been acquired, the $n$ acquired images IP held in the acquired image storage circuit 17 are synthesized to generate a grouped image GP(1). The generated grouped image GP(1) is held in the grouped image storage circuit 18. This is expressed by the following equation, GP(1)=IP(1, 1)+IP(1, 2)+ . . . +IP(1, n).

Even while a grouped image GP is being generated, images are sequentially acquired in a continuous manner. After acquired images IP are transferred so as to generate a grouped image GP, an image area in the acquired image storage circuit 17 is cleared, and new acquired images IP are accumulated. Namely, the acquired images IP(1, 1) to (1, n) are cleared at the same time when the grouped image GP(1) is generated, and acquired images IP(2, 1) to IP(2, n) for generating the next grouped image GP(2) are held in the acquired image storage circuit 17.

When the acquisition of the acquired images IP(2, 1) to IP(2, n) is completed, the second grouped image GP(2) is generated by synthesizing the acquired images IP(2, 1) to IP(2, n) as is the case with the first grouped image GP(1). The second grouped image GP(2) is then held in the acquired image storage circuit 17. This is expressed by the following equation, GP(2)=IP(2, 1)+IP(2, 2)+ . . . +IP(2, n).

In the above described way, the generation of a grouped image GP is carried out whenever $n$ acquired images IP are acquired. When the $m$th grouped image GP(m) is generated according to the equation GP(m)=IP(m, 1)+IP(m, 2)+ . . . +IP(m, n), the grouped images GP held at that time are read. Then, the grouped image GP(1) to GP(m) are then synthesized according to the equation P(1)=GP(1)+GP(2)+ . . . +GP(m) to generate a display image P(1). The display image P(1) is displayed by, for example, the display circuit 8.

Thereafter as well, acquired images IP are sequentially acquired, and eventually, the m+1th grouped image GP(m+1) is generated. Then, the grouped images GP(2) to GP(m+1) are synthesized according to the equation P(2)=GP(2)+GP(3)+ . . . +GP(m+1) to generate a display image P(2) and the image displayed by the display circuit 8 is updated.

In the above described way, grouped images GP are sequentially generated, and grouped images GP from the latest grouped image GP are synthesized to generate a display image P(x). This is expressed by the following equation, P(x)=GP(x)+GP(x+1)+ . . . +GP(m+x−1). The image displayed by the display circuit 8 is sequentially updated to the latest display image P(x), and they are displayed, for example, as successive images for live preview.

A description will now be given of how the image pickup apparatus operates.

Figure 4A:
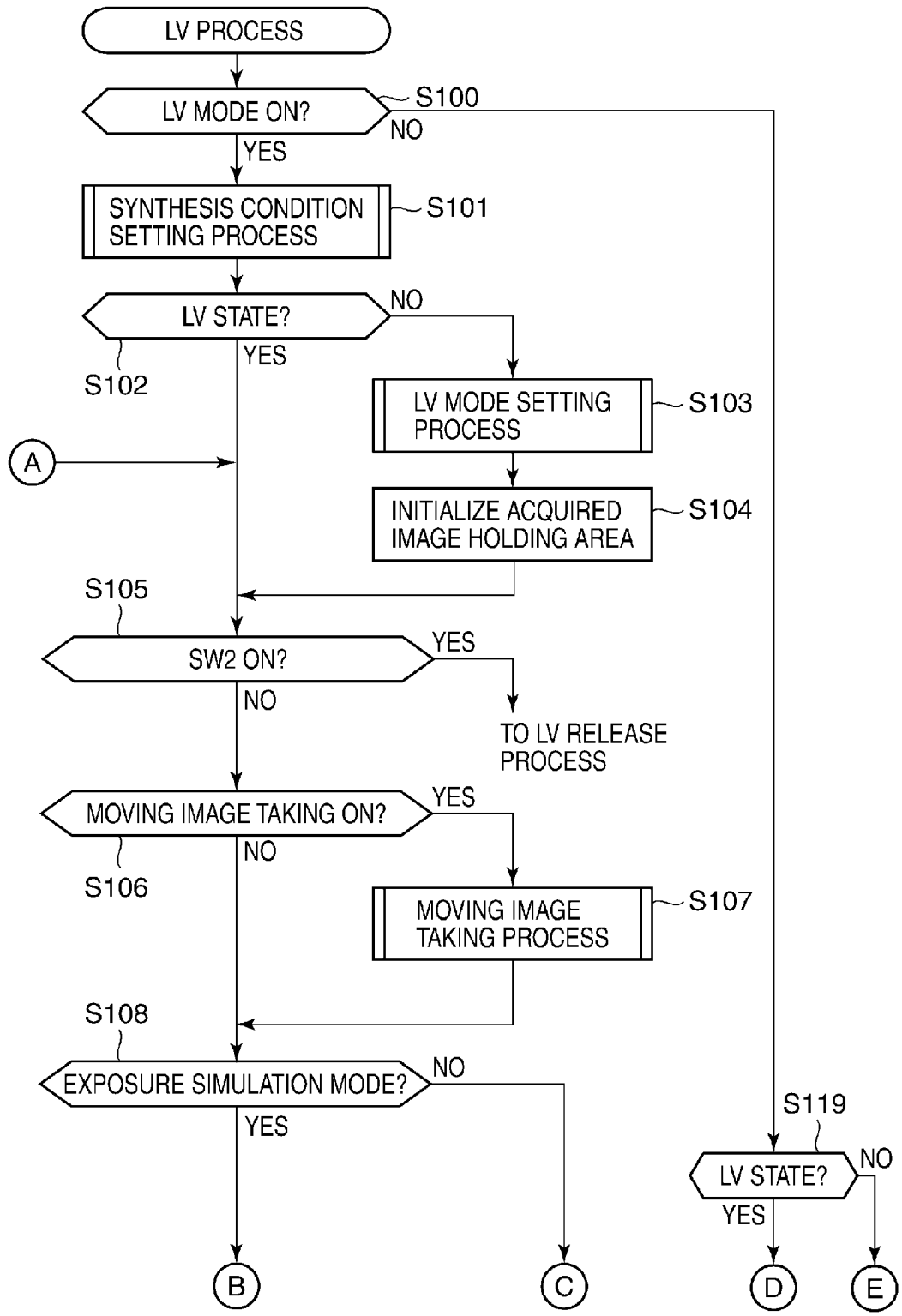
FIGS. 4A and 4B are flowcharts of a live view (LV) process.
Figure 4B:
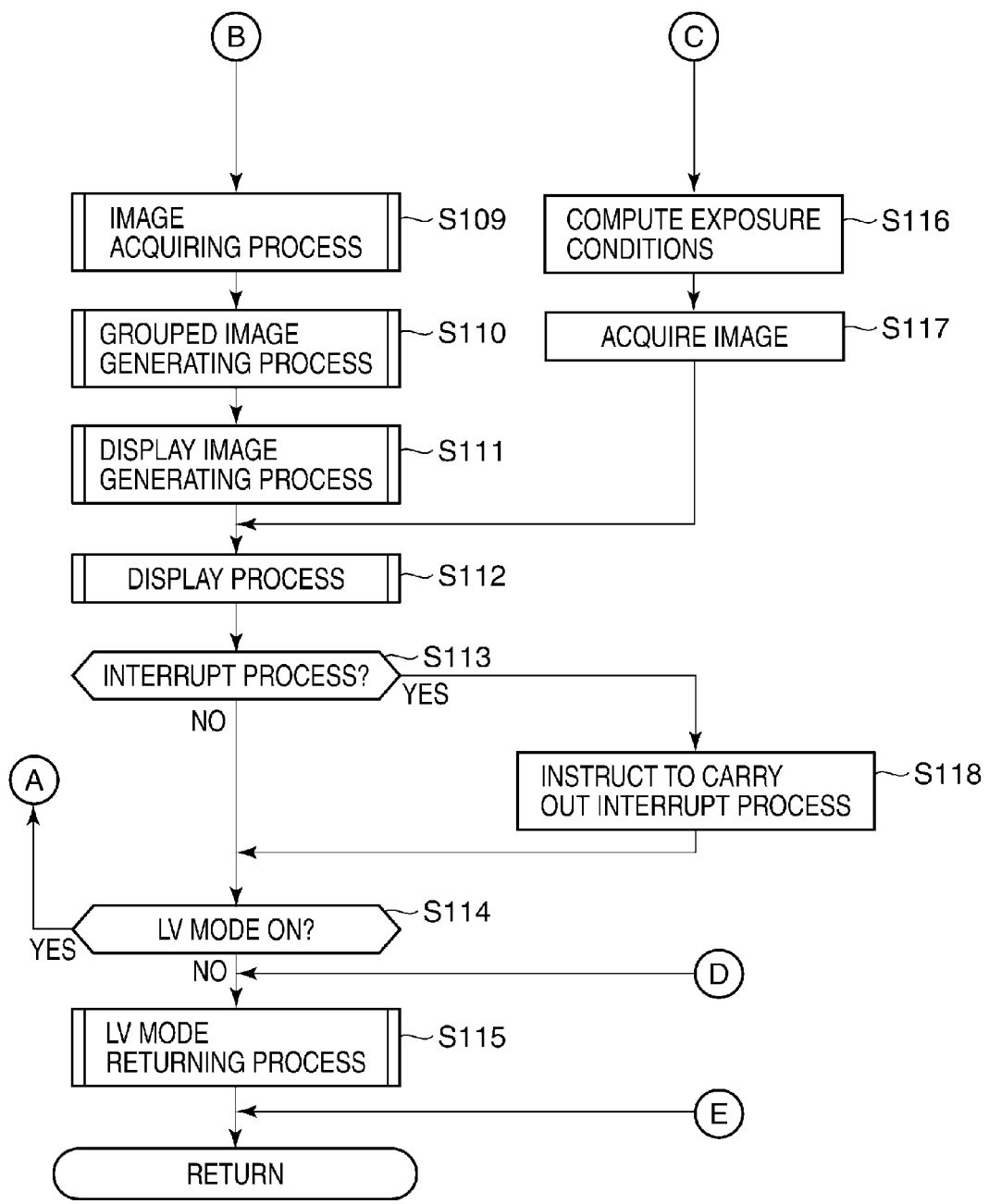

FIGS. 4A and 4B are flowcharts of a live view (LV) process carried out by the image pickup apparatus. This process is started when the power to the image pickup apparatus is turned on.

First, in step S100, the processor 112 determines whether or not the image pickup apparatus is placed in a live view mode (hereafter referred to as "the LV mode") (ON). When, as a result of the determination, the live view mode is ON, the processor 112 proceeds to step S101, and on the other hand, when the live view mode is OFF, the processor 112 proceeds to step S119.

Then, in the step S101, the processor 112 carries out a synthesis condition setting process (to be described later with reference to FIG. 5) in which conditions for how acquired images IP are synthesized are set and proceeds to step S102. Then, in the step S101, the processor 112 determines whether or not the image pickup apparatus is placed in an LV state. When the image pickup apparatus is placed in an LV state, the processor 112 proceeds to step S105, and when the image pickup apparatus is not placed in an LV state, the processor 112 carries out processes in steps S103 and S104 and then proceeds to the step S105.

In the step S103, the processor 112 carries out an LV mode setting process (to be described later with reference to FIG. 6) in which it places the image pickup apparatus in an LV state. In the step S104, the processor 112 resets an image storing area in the acquired image storage circuit 17 for storing acquired images IP, and proceeds to the next step S105.

In the step S105, the processor 112 determines whether or not a release signal for the image pickup apparatus has been generated, that is, whether or not the switch 15 (SW2) is ON. When, as a result of the determination, the switch SW2 is ON, the processor 112 proceeds to a release process in the LV mode. The release process in the LV mode will be described later with reference to FIGS. 8A and 8B. On the other hand, when the switch SW2 is OFF, the processor 112 determines in step S106 whether or not a moving image taking switch (not shown) for causing the image pickup apparatus to start taking moving images is ON.

When in the step S106, when the moving image taking switch is OFF, the processor 112 proceeds to step S108. On the other hand, when the moving image taking switch is ON, the processor 112 carries out a moving image taking process (to be described later with reference to FIG. 14) and then proceeds to the step S108.

In the step S108, the processor 112 determines whether or not a display mode in the LV mode is a normal mode or an exposure simulation mode in which exposure setting values (exposure conditions) are reproduced. When, as a result of the determination, the display mode in the LV mode is the exposure simulation mode, the processor 112 proceeds to step S109, and on the other hand, when the display mode in the LV mode is the normal mode, the processor 112 proceeds to step S116.

In the step S109, the processor 112 causes the image pickup device 106 to carry out an image acquiring process in which images (acquired images IP) are acquired (to be described later with reference to FIG. 9). Then, in step S110, the processor 112 carries out a grouped image generating process (to be described later with reference to FIG. 10) in which it synthesizes acquired images IP to generate grouped images GP. Then, in step S111, the processor 112 carries out a display image generating process (to be described later with reference to FIG. 11) in which it synthesizes the grouped images GP generated in the step S110 to generate a display image P, and proceeds to step S112. In the step S112, the processor 112 carries out a display process (to be described later with reference to FIG. 12) in which it displays the display image P generated in the step S111.

Then, in step S113, the processor 112 determines whether or not there has been an instruction to carry out an interrupt process. When, as a result of the determination, there has been an instruction to carry out an interrupt process, the processor 112 issues an instruction to carry out the interrupt process (step S118), and proceeds to step S114. As a result, the interrupt process is carried out. On the other hand, when there has been no instruction to carry out an interrupt process, the processor 112 proceeds to the step S114.

In the step S114, the processor 112 determines whether or not the LV mode is ON. When, as a result of the determination, the LV mode is ON, the processor 112 returns to the step S105, and on the other hand, when the LV mode is OFF, the processor 112 proceeds to step S115. In the step S115, the processor 112 carries out an LV mode restoring process (to be described later with reference to FIG. 7) in which it returns the image pickup apparatus from the LV state to a standby state, and terminates the LV process in FIGS. 4A and 4B.

In the step S119, the processor 112 determines whether or not the image pickup apparatus is placed in the LV state. When, as a result of the determination, the image pickup apparatus is placed in the LV state, the processor 112 proceeds to the step S115, and on the other hand, when the image pickup apparatus is not placed in the LV state, the processor 112 terminates the LV process in FIGS. 4A and 4B.

In the step S116, the processor 112 computes exposure conditions displayed in the LV mode, and then, in step S117, the processor 112 acquire images based on the exposure conditions computed in the step S116, and proceeds to the step S112. The computed exposure conditions are stored in the storage circuit 10.

FIG. 5 is a flowchart of the synthesis condition setting process carried out in the step S101 in FIG. 4A.

First, in step S1400, the processor 112 reads the set exposure conditions from the storage circuit 10, and then, in step S1403, the processor 112 determines whether or not an image stabilization mode is set in the image pickup apparatus. The image stabilization mode is set by the user manipulating an operation element, not shown.

When, as a result of the determination, the image stabilization mode is not set, the processor 112 proceeds to step S1408. On the other hand, when the image stabilization mode is set, the processor 112 proceeds to step S1404 in which it acquires a plurality of images and detects motion vectors based on detection results acquired by the motion vector detecting circuit 16. Then, in step S1405, the processor 112 changes the maximum accumulation time (an upper limit to the time for which charges are accumulated) based on the detected motion vectors, and proceeds to the step S1408.

In the step S1408, the processor 112 determines whether or not the exposure time set in the exposure conditions mentioned above is equal to or more than a predetermined value. When, as a result of the determination, the exposure time is equal to or more than the predetermined value, the processor 112 proceeds to step S1409, and on the other hand, when the exposure time is less than the predetermined value, the processor 112 proceeds to step S1410. In the step S1409, the processor 112 changes the sensor sensitivity at the time of acquisition of LV images so that the exposure time can be equal to the predetermined value, and proceeds to the step S1410. Namely, by changing the gain of the image pickup device 106 at the time of image acquisition, the processor 112 limits the image capturing time to within a predetermined range.

In the step S1410, the processor 112 calculates the number of images required to be added $p$ based on the exposure conditions. The number of images required to be added $p$ is the number of images required to generate images based on the set exposure conditions. Namely, the number of images required to be added $p$ is the number of images acquired by calculating how many acquired images are needed to achieve a brightness considered appropriate for an image. For example, as compared to a brightness considered appropriate for an image, if the brightness of an acquired image is 0.5, an appropriate brightness can be achieved by synthesizing two images, and if the brightness of an acquired image is 0.05, an appropriate brightness can be achieved by synthesizing twenty images.

In step S1420, the processor 112 determines whether or not the calculated number of images required to be added $p$ is equal to or more than a predetermined value. When the number of images required to be added $p$ is equal to or more than the predetermined value, the processor 112 sets the number of held groups $m$ and the number of constituent images $n$ in steps S1430 and S1440, and terminates the synthesis condition setting process in FIG. 5.

Here, the number of held groups $m$ and the number of constituent images $n$ may be set by the user manipulating an operation element, not shown. Alternatively, they may be obtained by computations based on brightness of acquired images (for example, exposure time at the time of image acquisition) or motion vectors of the images as described below.

First, parameters are defined as below.
S: Set shutter speed
M: Memory capacity for holding image data
Ms: One-frame capacity in set image size
F: Frame rate of display image
Fmin: Minimum frame rate of display image
V: Motion vector quantity of image
A: Maximum number of frames that can be held
b: Constant As for frame rate F, $F=b \times V$ when $b \times V > Fmin$, and $F=Fmin$ when $b \times V \leq Fmin$. The number of frames required to display one frame is $S \times F$. Thus, on the condition that $A=INT(M/Ms)=m+n$ is satisfied, $n=S \times F$ when $A \geq S \times F$, and $n=INT(S \times F/M)+1$ when $A < S \times F$ (digits to the right of the decimal point are matched by gain adjustment). m is also calculated by $A=m+n$.

In LV display, even when exposure is prolonged so as to obtain appropriate exposure, image update is made at predetermined intervals so as to express changes in image, and a period of time for one frame is limited. Thus, the number of constituent images $n$ is calculated with consideration given to exposure time. When motion vector quantity is large, an image is blurred when accumulating processing takes much time. Thus, as described above, the number of constituent images $n$ is calculated with consideration to motion vector so as to reduce image blur by shortening the time for which a one-frame image is accumulated and decreasing the number of images to be synthesized.

The above described way in which the number of held groups m and the number of constituent images n are set is only illustrative, and they may be set in different ways. Their values are stored in the storage circuit 10.

When the number of images required to be added p is equal to or more than the predetermined value in the step S1420, the processor 112 proceeds to step S1450 in which it makes such a setting as to directly synthesize acquired images IP, and terminates the synthesis condition setting process in FIG. 5. In this setting for direct synthesis, m is set at 1, and n is set to be equal to p, that is, m=1 and n=p.

Figure 6:
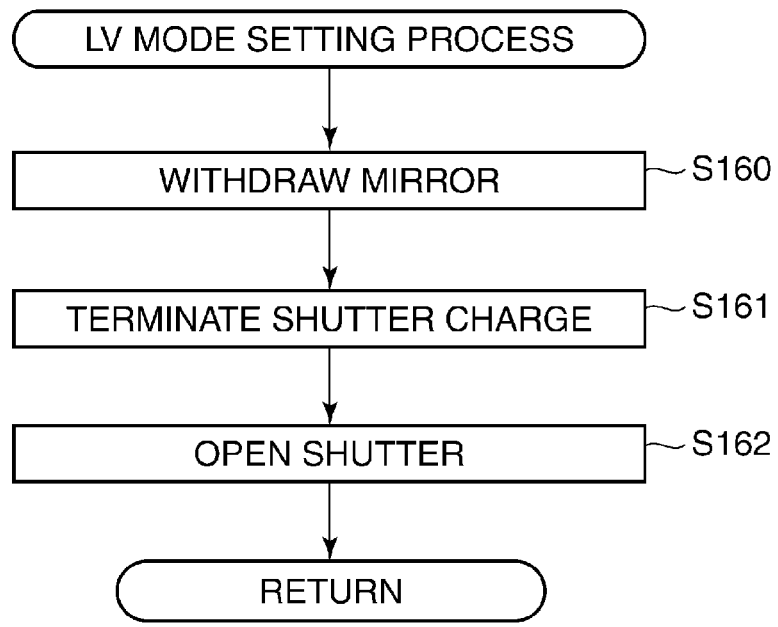
FIG. 6 is a flowchart of an LV mode setting process carried out in step S103 in FIG. 4A.

FIG. 6 is a flowchart of the LV mode setting process carried out in the step S103 in FIG. 4A.

First, in step S160, the processor 112 carries out a withdrawing operation so as to withdraw the main half mirror 104 and the sub mirror 105 from an image pickup light path of the image pickup device 106. Then, in step S161, the processor 112 drives a charge unit (not shown) holding the shutter unit 107, which is shielding the image pickup device 106 from light, in a state of readiness for shooting, thus terminating shutter charge. Then, in step S162, the processor 112 causes the shutter unit 107 to terminate light-shielding, and enables the image pickup device 106 to receive a pencil of light from the image pickup optical system (the lens 202), followed by terminating the process.

Figure 7:
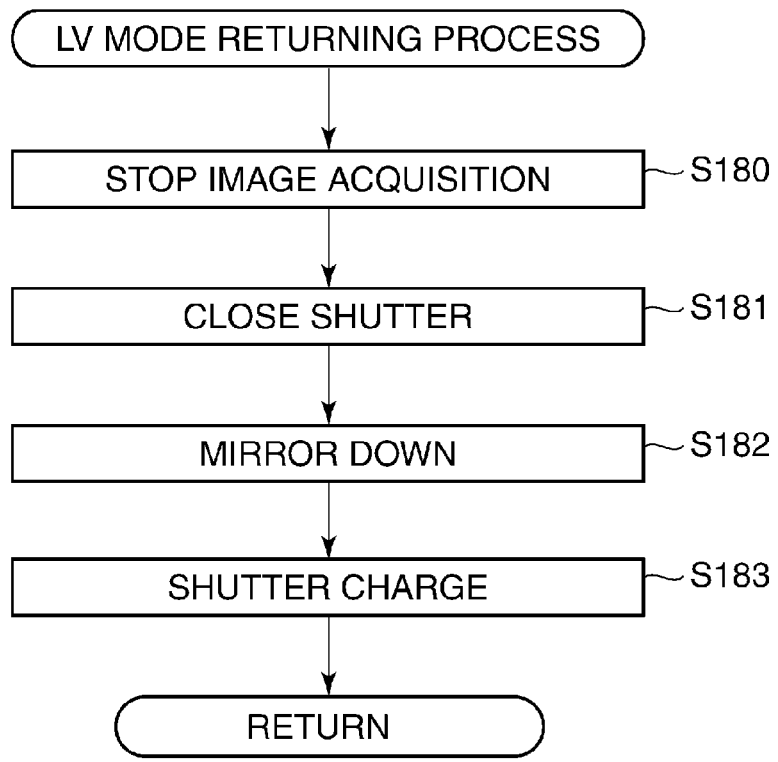
FIG. 7 is a flowchart of an LV mode restoring process carried out in step S115 in FIG. 4B.

FIG. 7 is a flowchart of the LV mode restoring process carried out in the step S115 in FIG. 4B.

First, in step S180, the processor 112 causes the image pickup device 106 to stop acquiring images, and then, in step S181, the processor 112 drives the shutter unit 107 into a closed state. Then, in step S182, the processor 112 moves the main half mirror 104 and the sub mirror 105 back into the image pickup light path (mirror down). Then, in step S183, the processor 112 carries out a charge operation for returning the shutter charge, that is, the shutter unit 107 back into a state of readiness for the next shooting operation, followed by terminating the process.

Figure 8A:
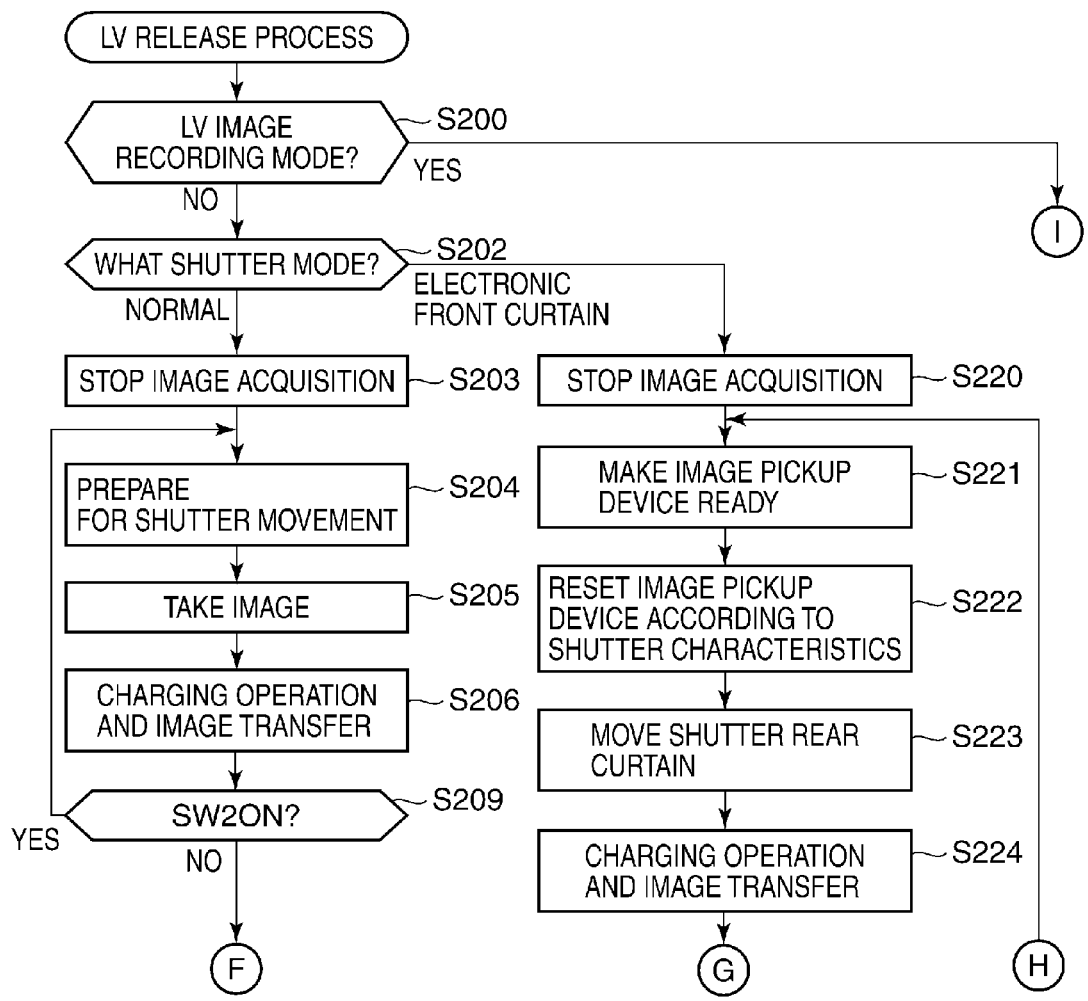
FIGS. 8A and 8B are flowcharts of a release process from a live view state.
Figure 8B:
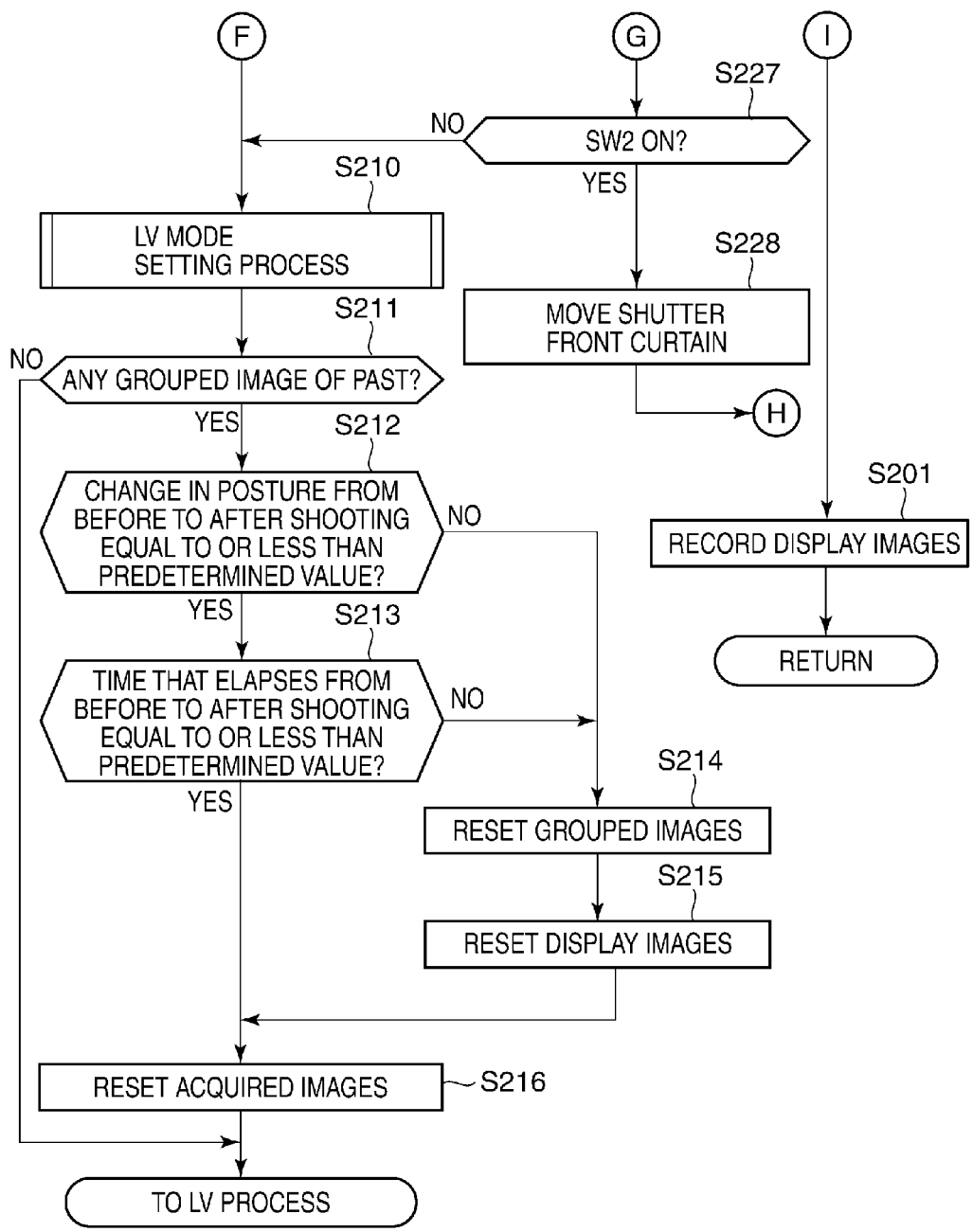

FIGS. 8A and 8B are flowcharts of the release process from the live view state.

First, in step S200, the processor 112 determines whether or not the recording mode in which the image pickup apparatus is placed is an LV image recording mode in which an LV image is recorded as it is. When, as a result of the determination, the recording mode is the LV image recording mode, the processor 112 proceeds to step S201, in which it stores images displayed in the LV mode in the image data recording circuit 19 and returns to the original flow.

On the other hand, when in the step S200, the recording mode is not the LV image recording mode, the processor 112 proceeds to step S202, in which it determines whether or not a shutter mode in which the image pickup apparatus is placed is a normal mode or an electronic front curtain mode. The normal mode is a mode in which exposure is controlled to start and end by a mechanism. The electronic front curtain mode is a mode in which exposure is started by resetting of the image pickup device 106, and exposure is controlled to end by a mechanism.

When, as a result of the determination in the step S202, the shutter mode is the normal mode, the processor 112 proceeds to step S203, and on the other hand, when the shutter mode is the electronic front curtain mode, the processor 112 proceeds to step S220.

In the step S203, the processor 112 causes the image pickup device 106 to stop an image acquiring operation in which it repeatedly accumulates images in the LV mode, and in the next step S204, to prepare for an image taking process, the processor 112 brings the shutter unit 107 into a charge state so that the shutter unit 107 can be ready for shooting. Then, in step S205, the processor 112 takes an image by driving the shutter unit 107 and exposing the image pickup device 106 to light.

Then, in step S206, the processor 112 carries out a charge operation for returning the shutter unit 107 having finished operation into a standby state, and transfers the taken image data. At the time both the charge operation and the image transfer are completed, the processor 112 proceeds to step S209.

In the step S209, the processor 112 determines whether or not the SW2 which is a release signal remains ON. When the SW2 remains ON, the processor 112 returns to the step S204, in which it carries out an operation to prepare for shutter movement. On the other hand, when the SW2 remains OFF, the processor 112 proceeds to the step S210.

In the step S210, the processor 112 carries out the LV mode setting process (described above with reference to FIG. 6), and then, in step S211, the processor 112 determines whether or not there is any grouped image GP of the past used in the LV mode. When, as a result of the determination, there is no grouped image GP of the past, the processor 112 returns to the LV process routine in FIGS. 4A and 4B. On the other hand, when there is any grouped image GP of the past, the processor 112 proceeds to step S212.

In the step S212, based on the result of detection by the posture detecting circuit 13, the processor 112 determines whether or not a change in the posture of the image pickup apparatus main body 100 between before and after shooting is equal to or less than a predetermined value. When, as a result of the determination, the change in posture is equal to or less than the predetermined value, the processor 112 proceeds to step S213, and on the other hand, when the change in posture is more than the predetermined value, the processor 112 proceeds to step S214.

In the step S213, the processor 112 determines whether or not the time that elapses from before to after shooting is equal to or less than a predetermined value. When, as a result of the determination, the time that elapses from before to after shooting is equal to or less than the predetermined value, the processor 112 proceeds to step S216, and on the other hand, when the time that elapses from before to after shooting is more than the predetermined value, the processor 112 proceeds to the step S214.

In the step S214, the processor 112 resets (clears) grouped images GP held in the grouped image storage circuit 18, and then, in step S215, the processor 112 resets display images P to be displayed on the screen and proceeds to the step S216. In the step S216, the processor 112 resets the acquired images IP and returns to the LV process in FIGS. 4A and 4B.

According to the processes in the steps S211 to S216, when a change in the status (posture or elapsed time) of the image pickup apparatuses is great, grouped images GP and display images P are reset. However, a change in the status (posture or elapsed time) of the image pickup apparatuses is small after shooting, simulation displays are produced using images accumulated before shutter release without resetting grouped images GP and display images P.

In the step S220, the processor 112 causes the image pickup device 106, which has been repeatedly accumulating images in the LV mode, to stop acquiring images, and then, in step S221, the processor 112 brings the image pickup device 106 into a state of readiness for image pickup. Then, in step S222, the processor 112 sequentially resets the image pickup device 106 in accordance with movement characteristics of the shutter unit 107, and in step S223, the processor 112 moves the rear curtain of the shutter unit 107. Then, in step S224, the processor 112 carries out a charge operation for returning the shutter unit 107 which has finished operation to a standby state, and transfers taken image data. The processor 112 proceeds to the step S227 at the time when both the charging operation and the image transfer are completed.

In the step S227, the processor 112 determines whether or not the SW2 which is a release signal remains ON. When, as a result of the determination, the SW2 remains ON, the processor 112 proceeds to step S228, and on the other hand, the SW2 is OFF, the processor 112 proceeds to the step S210. In the step S228, the processor 112 brings the shutter unit 107 into an opened state by moving the front curtain thereof, and returns to the step S221.

Figure 9:
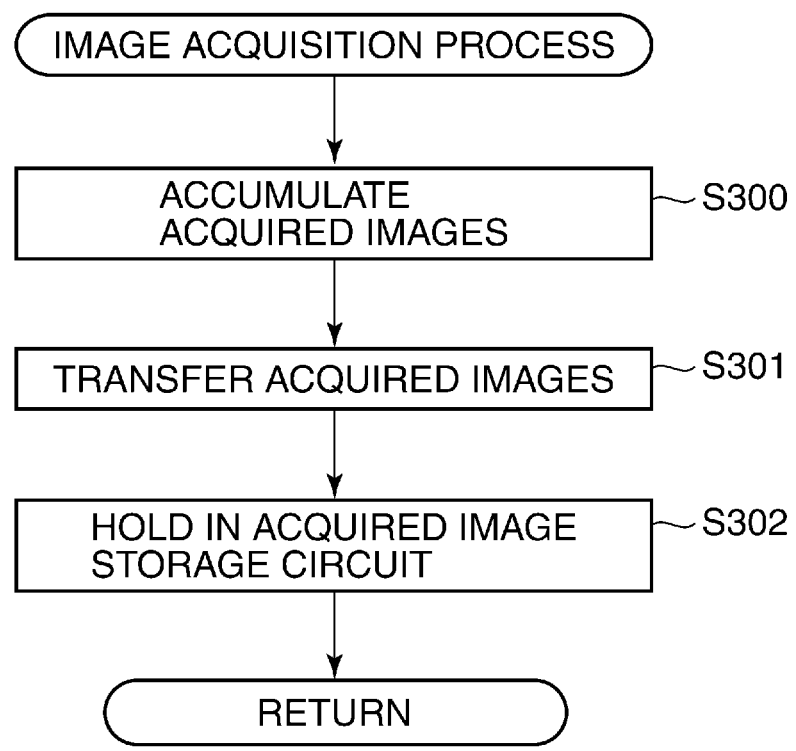
FIG. 9 is a flowchart of an image acquiring process carried out in step S109 in FIG. 4B.

FIG. 9 is a flowchart of the image acquiring process carried out in the step S109 in FIG. 4B.

First, in step S300, the processor 112 causes the image pickup device 106 to accumulate acquired images IP, and then, in step S301, the processor 112 transfers the acquired images IP. Then, in step S302, the processor 112 causes the acquired image storage circuit 17 to hold the transferred acquired images IP, thus completing the image acquiring process in FIG. 9.

Figure 10:
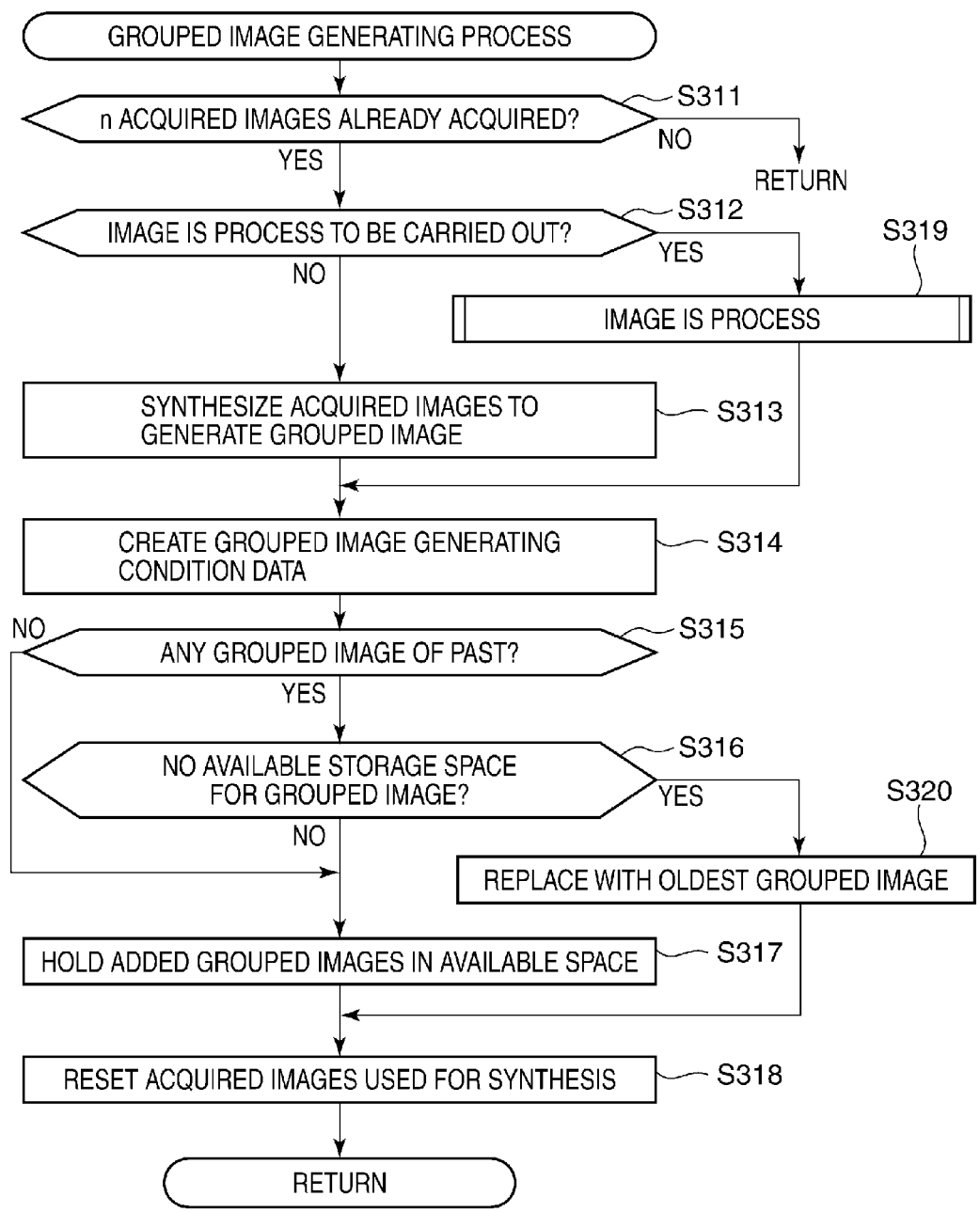
FIG. 10 is a flowchart of a grouped image generating process carried out in step S110 in FIG. 4B.

FIG. 10 is a flowchart of the grouped image generating process carried out in the step S110 in FIG. 4B.

First, in step S311, the processor 112 determines whether or not acquired images IP corresponding in number to the number of constituent images $\underline{n}$ have already been acquired. When, as a result of the determination, $\underline{n}$ acquired images IP have not been acquired yet, the processor 112 terminates the process and proceeds to the step S111 in FIG. 4B. On the other hand, when $\underline{n}$ acquired images IP have already been acquired, the processor 112 determines in step S312 whether or not a request to carry out an image IS process, that is, an image vibration isolation control process has been made. Whether or not to carry out the image IS process is specified by the user operating an operation element, not shown.

When, as a result of the determination, a request to carry out the image IS process has not been made, the processor 112 proceeds to step S313. In the step S313, the processor 112 reads the $\underline{n}$ acquired images IP held in the acquired image storage circuit 17, and synthesizes them to generate a grouped image GP (see FIG. 3 as well). Then, the processor 112 proceeds to step S314. On the other hand, when in the step S312, a request to carry out the image IS process has been made, the processor 112 carries out the image IS process in the step S319 (to be described later with reference to FIG. 13) and then proceeds to the step S314. The grouped image GP is generated in the step S313 or step S356 in FIG. 13 (to be described later).

In the step S314, the processor 112 creates grouped image generating condition data indicative of conditions on which the grouped image GP is generated. Examples of the grouped image generating condition data include a corresponding exposure time corresponding to the time for which the grouped image GP is exposed, an aperture value acquired from an aperture value of images used to generate the grouped image GP. Further, the examples include an ISO sensitivity value acquired from ISO sensitivities of images used to generate the grouped image GP. However, any other items may be added, or any items may be deleted. The grouped image generating condition data is associated with the grouped image GP and stored in, for example, the grouped image storage circuit 18.

Then, in step S315, the processor 112 determines whether or not there is any grouped image GP of the past (generated in the past). When, as a result of the determination, there is no grouped image GP of the past, the processor 112 proceeds to step S317, and on the other hand, when there is any grouped image GP of the past, the processor 112 proceeds to step S316.

In the step S316, the processor 112 determines whether or not in the grouped image storage circuit 18, there is any available storage space for storing the grouped image GP. When, as a result of the determination, there is any available storage space, the processor 112 proceeds to step S317, and on the other hand, when there is no available storage space, the processor 112 executes step S320 and then proceeds to the step S317.

In the step S317, the processor 112 stores the generated grouped image GP in the available storage space in the grouped image storage circuit 18 and proceeds to step S318. In the step S320, the processor 112 deletes the oldest one of grouped images GP held in the grouped image storage circuit 18 so as to reserve an available space, and stores the newly generated grouped image GP in the grouped image storage circuit 18. Thus, the processor 112 replaces the oldest one of grouped images GP held in the grouped image storage circuit 18 with the newly generated grouped image GP so that the new grouped image G can be held. Then, the processor 112 proceeds to the step S318.

In the step S318, the processor 112 sequentially deletes (clears) the acquired images IP used for generation of the grouped image GP (synthesis) in the step S313 or the step S319 from the acquired image storage circuit 17 and terminates the grouped image generating process in FIG. 10.

Because a grouped image IP is generated in this process, acquired images IP can be held collectively, and the holding area required in the acquired image storage circuit 17 can be reduced.

Figure 11:
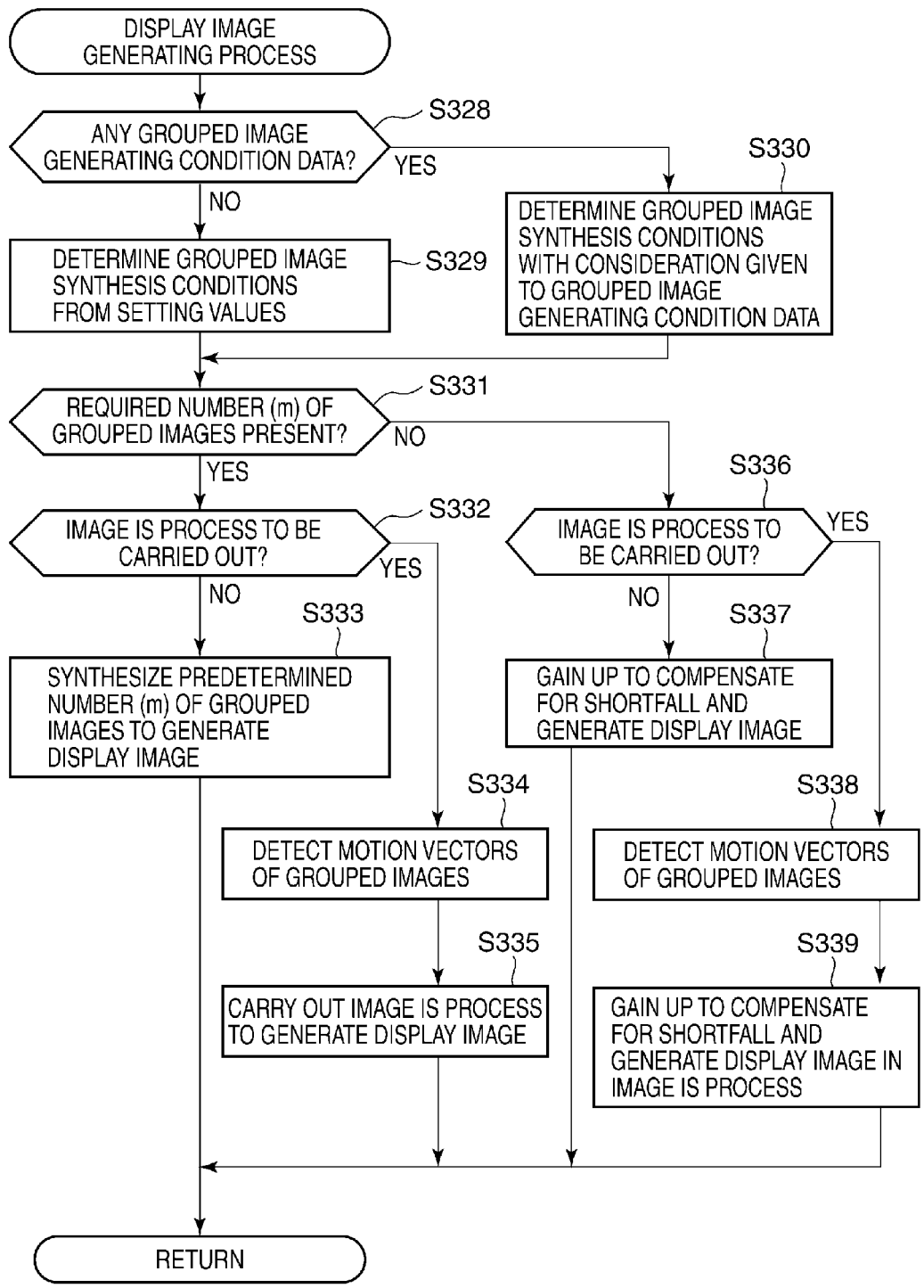
FIG. 11 is a flowchart of a display image generating process carried out in step S111 in FIG. 4B.

FIG. 11 is a flowchart of the display image generating process carried out in the step S111 in FIG. 4B.

First, in step S328, the processor 112 determines whether or not there is grouped image generating condition data associated with the grouped images GP. When, as a result of the determination, there is no grouped image generating condition data associated with the grouped images GP, the processor 112 proceeds to step S329, and on the other hand, when there is grouped image generating condition data associated with grouped images GP, the processor 112 proceeds to step S330.

In the step S329, based on setting values, the processor 112 determines grouped image generating conditions which are conditions on which the grouped images GP held in the holding area in the grouped image storage circuit 18, and proceeds to step S331. Here, the setting values are set by the user manipulating an operation element, not shown, as conditions on which an image is generated, and examples of them include a setting as to whether or not the mode is a mode in which an image is stabilized, or a mode in which exposure is simulated.

On the other hand, in the step S330, the processor 112 acquires grouped image generating condition data associated with the grouped images GP, determines grouped image generating conditions with consideration given to the grouped image generating condition data, and proceeds to the step S331.

In the step S331, the processor 112 determines whether or not there are grouped images GP corresponding in number to the number of images required to acquire a display image P by synthesis (the number of held groups $\underline{m}$). When, as a result of the determination, there are grouped images GP corresponding in number to the number of held groups m, the processor 112 proceeds to step S332, and on the other hand, when there are not grouped images GP corresponding in number to the number of held groups m, the processor 112 proceeds to step S336.

In the step S332, the processor 112 determines whether or not a request to carry out an image IS process has been made. Whether or not to carry out an image IS process is specified by the user manipulating an operation element, not shown. When, as a result of the determination, a request to carry out an image IS process has not been made, the processor 112 proceeds to step S333, and on the other hand, when a request to carry out an image IS process has been made, the processor 112 proceeds to step S334.

In the step S333, the processor 112 determines that a predetermined number of grouped images GP (here, the number of held groups m) from the latest one among grouped images GP held in the grouped image storage circuit 18 are to be synthesized, and synthesizes them to generate a display image P (see FIG. 3 as well).

In the step S334, the processor 112 detects motion vectors of the m grouped images GP from the latest one based on results of detection by the motion vector detection circuit 16. Then, in step S335, the processor 112 carries out an image IS process to generate a display image P.

Figure 13:
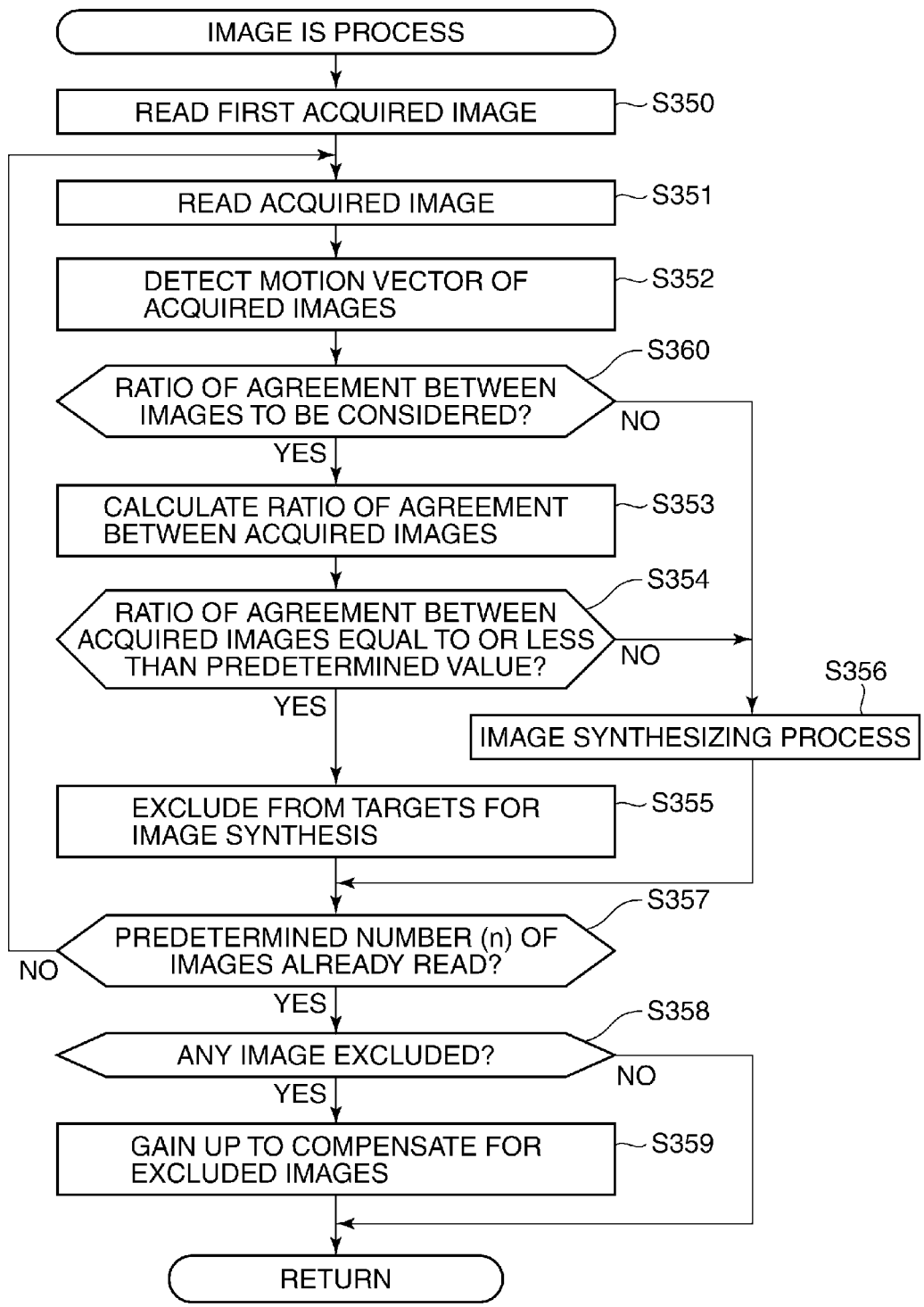
FIG. 13 is a flowchart of an image IS process carried out in step S319 in FIG. 10.

The image IS process carried out in the step S335 corresponds to the image IS process in FIG. 13, to be described later. Namely, the image IS process itself in FIG. 13 is a process in which one grouped image GP is synthesized per n acquired images IP, but in the step S335, the image IS process in FIG. 13 is also applied to a processing stage where m grouped images GP are synthesized to generate a display image P. Thus, by applying the image IS process in FIG. 13 to synthesis for generation of a display image P, the display image P can be prevented from being blurred even when the degree of matching between grouped images GP is small.

In the step S336, the processor 112 carries out the same process as in the step S333. When, as a result of the determination in the step S336, the processor 112 proceeds to step S337 in a case where no request to carry out the image IS process has been made, and proceeds to step S338 in a case where a request to carry out the image IS process has been made.

In the step S337, the processor 112 generates a display image P by synthesizing grouped images GP being present. On this occasion, because the number of grouped images GP is not enough, the processor 112 gains up to compensate for a shortfall, and synthesizes grouped images GP. In the step S338, the processor 112 detects motion vectors of grouped images GP being present based on the result of detection by the motion vector detecting circuit 16. Then, in step S339, the processor 112 carries out an image IS process to generate a display image P, and at this time, the processor 112 gains up to compensate for a shortfall in the number of grouped images GP. The image IS process in the step S339 is the same as that in the step S335.

After carrying out the processes in the steps S333, S335, S337, and S339, the processor 112 terminates the display image generating process in FIG. 11. According to this process, because a display image P is generated by synthesizing grouped images GP, not by synthesizing acquired images IP, the load in a summation operation process in which a display image P is generated can be reduced.

Figure 12:
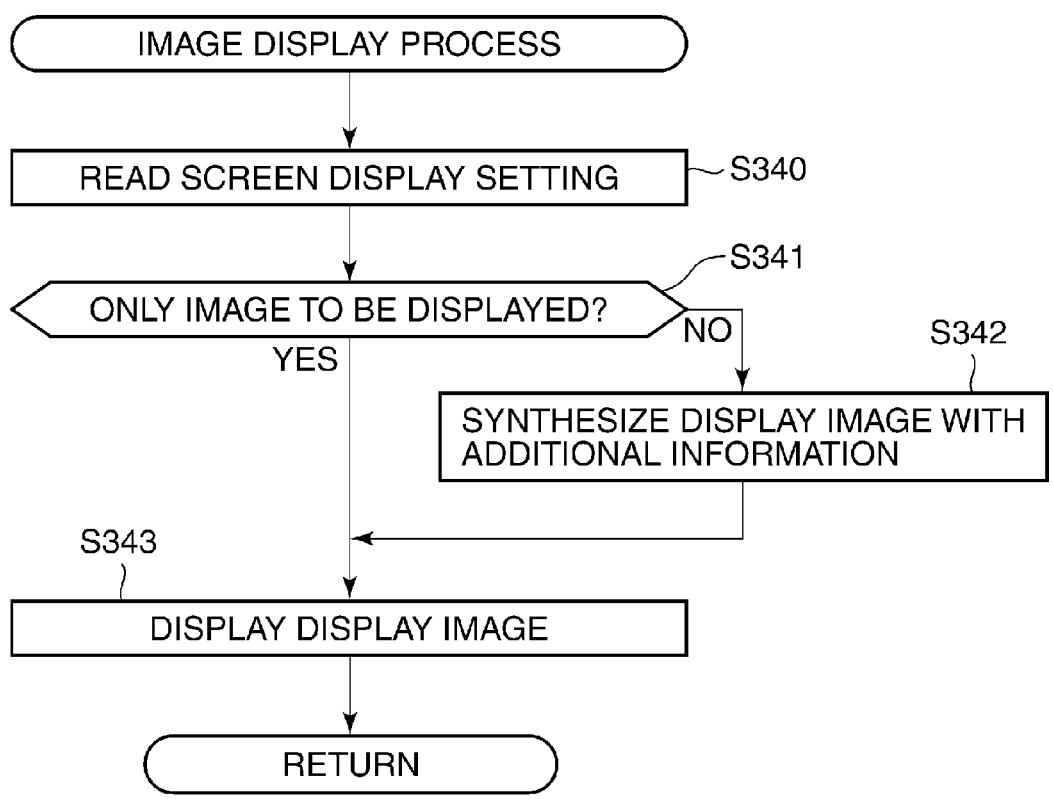
FIG. 12 is a flowchart of a display process carried out in step S112 in FIG. 4B.

FIG. 12 is a flowchart of the display process carried out in the step S112 in FIG. 4B.

First, in step S340, the processor 112 reads a screen display setting for the image pickup apparatus. The screen display setting is set by the user operating an operating element, not shown, and information on the same is held in the storage circuit 10.

Then, in step S341, the processor 112 determines whether or not the read screen display setting is to "display only image". When, as a result of the determination, the read screen display setting is to "display only image", the processor 112 proceeds to step S343 in which it causes the display circuit 8 to display a display image P and terminates the process.

On the other hand, as a result of the determination in the step S341, when the read screen display setting is not to "display only image", the processor 112 proceeds to step S342 in which it synthesizes a display image P with additional information, and in the step S343, causes an image acquired by the synthesis to be displayed.

This process sequentially displays display images P on the finder display unit 115 or the external display unit 116.

FIG. 13 is a flowchart of the image IS process carried out in the step S319 in FIG. 10.

First, in step S350, the processor 112 reads the first one of n acquired images IP held in the acquired image storage circuit 17, and then, in step S351, the processor 112 reads the next acquired image IP that have not been read.

Then, in step S352, the processor 112 compares the acquired image IP and the acquired image IP with each other, or compares the acquired image IP and a composite image (acquired by synthesis in the step S356, to be described later) with each other. Then, the processor 112 detects motion vectors of those images based on the result of detection by the motion vector detecting circuit 16.

Then, in step S360, the processor 112 determines whether or not to give consideration to the ratio of matching between images in generating a grouped image IP by synthesizing acquired images IP. Whether or not to give consideration to the ratio of matching between images is specified in advance by the user. When, as a result of the determination, when consideration is to be given to the ratio of matching between images, the processor 112 proceeds to step S353, and on the other hand, when consideration is not to be given to the ratio of matching between images, the processor 112 proceeds to the step S356.

In the step S353, based on the motion vectors detected in the step S352, the processor 112 calculates the ratio of matching between the compared images described above. Then, in step S354, the processor 112 determines whether or not the ratio of matching (the degree of matching) between the compared images is equal to or less than a predetermined value Y. When, as a result of the determination, the ratio of matching between the compared images is equal to or less than the predetermined value Y (the degree of matching is small), the processor 112 proceeds to step S355, and on the other hand, when the compared images is more than the predetermined value Y, the processor 112 proceeds to step S356.

In the step S355, the processor 112 excludes the acquired image IP, which is read and targeted for comparison this time, from targets to be synthesized. This prevents a display image P from being blurred. In the step S356, the processor 112 carries out a process in which it synthesizes the acquired image IP which is read to be one of targets for comparison this time, with an image which is the other one of targets for comparison. Here, the image which is the other one of targets for comparison means an acquired image IP read previously, or a composite image acquired by synthesis in the step S356. As a result of the step S356, a grouped image GP is generated in the image IS process.

After carrying out the process in the step S355 or S356, the processor 112 proceeds to step S357, in which it determines whether or not a predetermined number of acquired image IP (the number of constituent images $\underline{n}$ when this process is carried out in the step S319 in FIG. 10) have been read.

When, as a result of the determination, the predetermined number of ($\underline{n}$) acquired image IP have not been read, the processor 112 returns to the step S351 in which it reads the next acquired image IP. On the other hand, when the predetermined number of ($\underline{n}$) acquired image IP have been read, the processor 112 proceeds to step S358, in which it determines whether or not there is any acquired image IP that has been excluded from targets to be synthesized in the step S355.

When, as a result of the determination, there is any acquired image IP that has been excluded from targets to be synthesized, the processor 112 proceeds to step S359 in which it gains up grouped images IP to be synthesized for the number of excluded acquired images IP, and terminates the process. On the other hand, when there is no acquired image IP that has been excluded from targets to be synthesized, the processor 112 terminates the process because it is unnecessary to gain up.

Figure 14:
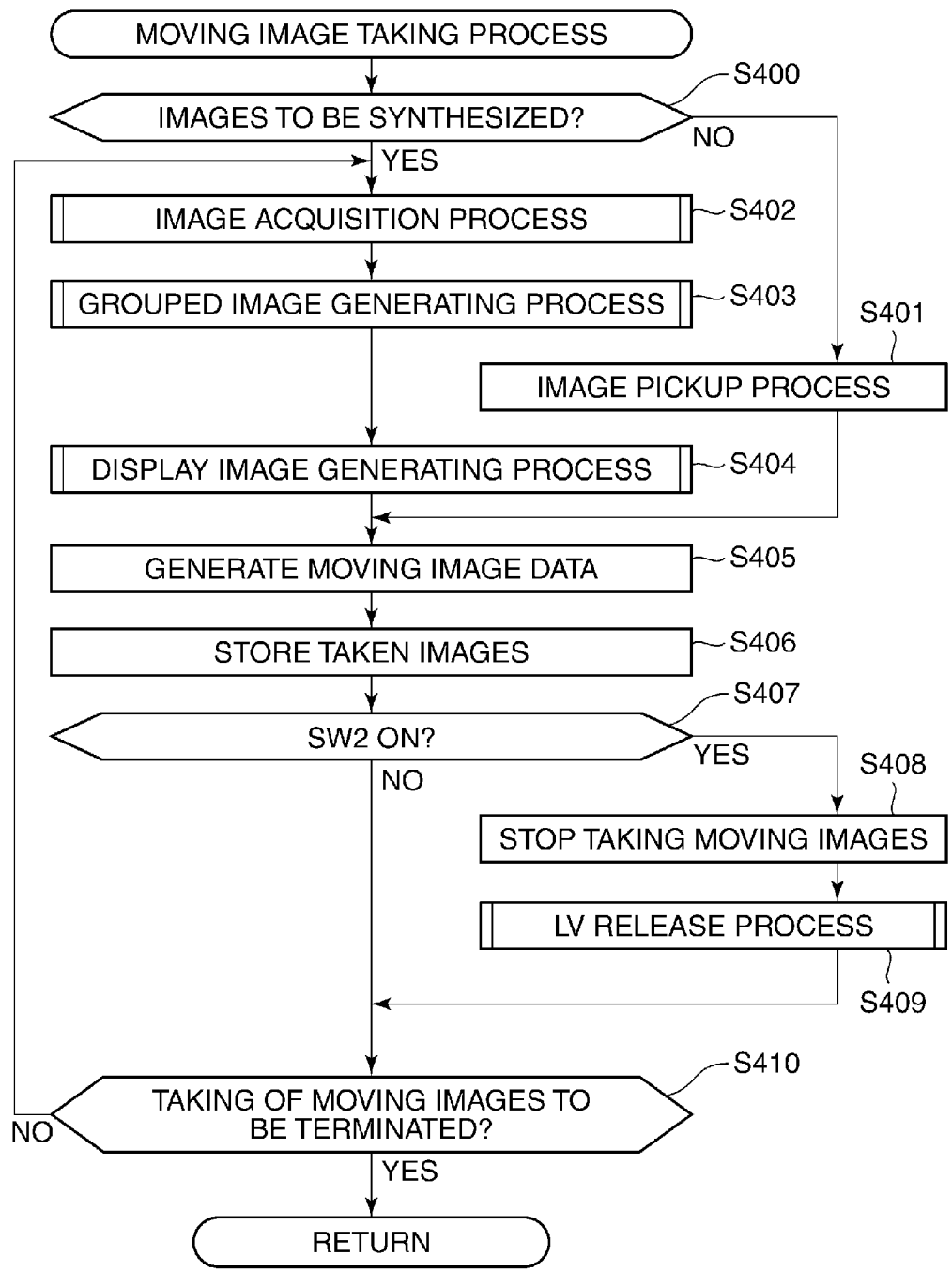
FIG. 14 is a flowchart of a moving image taking process carried out in step S107 in FIG. 4A.

FIG. 14 is a flowchart of the moving image taking process carried out in the step S107 in FIG. 4A.

First, in step S400, the processor 112 determines whether or not to synthesize images in taking a moving image. Whether or not to synthesize images can be specified in advance by the user. When, as a result of the determination, images are not to be synthesized, the processor 112 proceeds to step S401, and on the other hand, when images are to be synthesized, the processor 112 proceeds to step S402. In the step S401, the processor 112 carries out an image pickup process to acquire images at a predetermined frame rate, and proceeds to step S405.

As the processes in the steps S402 to 404, the process in which acquired images IP are synthesized to generate grouped images GP, and the grouped images GP are synthesized to generate a display image P is adopted even for moving image taking as in the case of the exposure simulation mode. Thus, the processes in the steps S402 to 404 are the same as those in the steps S109 to S111 in FIG. 4B. Namely, the processor 112 sequentially carries out the image acquiring process in FIG. 9, the grouped image generating process in FIG. 10, and the display image generating process in FIG. 11, and proceeds to the step S405.

In the step S405, the processor 112 generates moving image data based on images acquired in the step S401 or display images P generated in the step S404. Here, the moving image data is generated based on a selected moving image format. Then, in step S406, the processor 112 stores, in the image data recording circuit 19, the moving image data generated in the step S405.

Then, in step S407, the processor 112 determines whether or not the SW2, which is a switch for shooting a still image, is ON. When, as a result of the determination, the SW2 is ON, the processor 112 proceeds to step S408, and on the other hand, when the SW2 is OFF, the processor 112 proceeds to step S410. In the step S408, the processor 112 stops shooting a moving image, and then, in step S409, the processor 112 carries out a release process (FIGS. 8A and 8B) and proceeds to step S410.

In the step S410, the processor 112 determines whether or not to finish taking moving images. When, as a result of the determination, determining to finish taking moving images, the processor 112 terminates the moving image taking process in FIG. 14. On the other hand, when determining to continue to take moving images, the processor 112 returns to the step S402, in which it continues to take moving images.

According to the present process, even when moving images are taken while exposure corresponding to long exposure with which a plurality of images are synthesized, grouped images GP are generated once, and then moving images are generated, computation loads can be reduced.

According to the present embodiment, every time $\underline{n}$ acquired images IP are held, the acquired images IP are synthesized to generate a grouped image GP, and the acquired images IP used for synthesis are sequentially deleted from the acquired image storage circuit 17. As a result, the acquired image storage circuit 17 has only to have a storage space with such a capacity as to store at least $\underline{n}$ acquired images IP. Then, every time a new grouped image GP is held in the grouped image storage circuit 18, grouped images GP basically from the latest one of held grouped images GP to the $\underline{m}$th grouped image GP are synthesized to generate a display image P. As a result, as compared to the case where a display image P is generated every time an acquired image IP is acquired, the load in image synthesis can be reduced. Thus, when successive images are to be generated, the storage space for acquired images as well as the load in image synthesis can be reduced.

Namely, even at the time of underexposure due to low brightness, a set of images smaller in number than the total number of images to be synthesized are synthesized to generate grouped images GP, and the generated grouped images GP are synthesized to generate a display image P which is a final image. Thus, the holding space for storing acquired images IP can be reduced, and also, the number of data pieces to be held can be reduced, the load in computations on sequentially generated data can be reduced.

According to the present embodiment, as described above, every time $\underline{n}$ acquired images IP are held, the $\underline{n}$ acquired images IP are synthesized to generate a grouped image GP, and the acquired images IP used for synthesis are deleted from the acquired image storage circuit 17. The present invention, however, is not limited to this, but among the acquired images IP used for synthesis, only n/2 (or n/2½) acquired images IP may be deleted from the acquired image storage circuit 17, and when n/2 (or n/2½) acquired images IP are acquired next time, a grouped image GP may be generated. Namely, the number of acquired images IP to be deleted when a grouped image GP is generated, the time at which a grouped image GP is generated, the degree to which acquired images IP used for synthesis overlap, and so on are not particularly limited.

Although in the present embodiment, a single-reflex camera capable of through display images and live view displays, the present invention is not limited to this. Namely, the present invention may be applied to various image pickup apparatuses such as compact cameras and video cameras as long as they are capable of acquiring images using an image pickup unit.

In the first embodiment, acquired images IP which are objects to be synthesized so as to generate a grouped image GP are images that are sequentially acquired by image pickup. In the second embodiment, images acquired in advance are objects to be synthesized. The second embodiment is identical in basic arrangement with the first embodiment, and the same flowcharts are applied to the same operations as those in the first embodiment.

Figure 15:
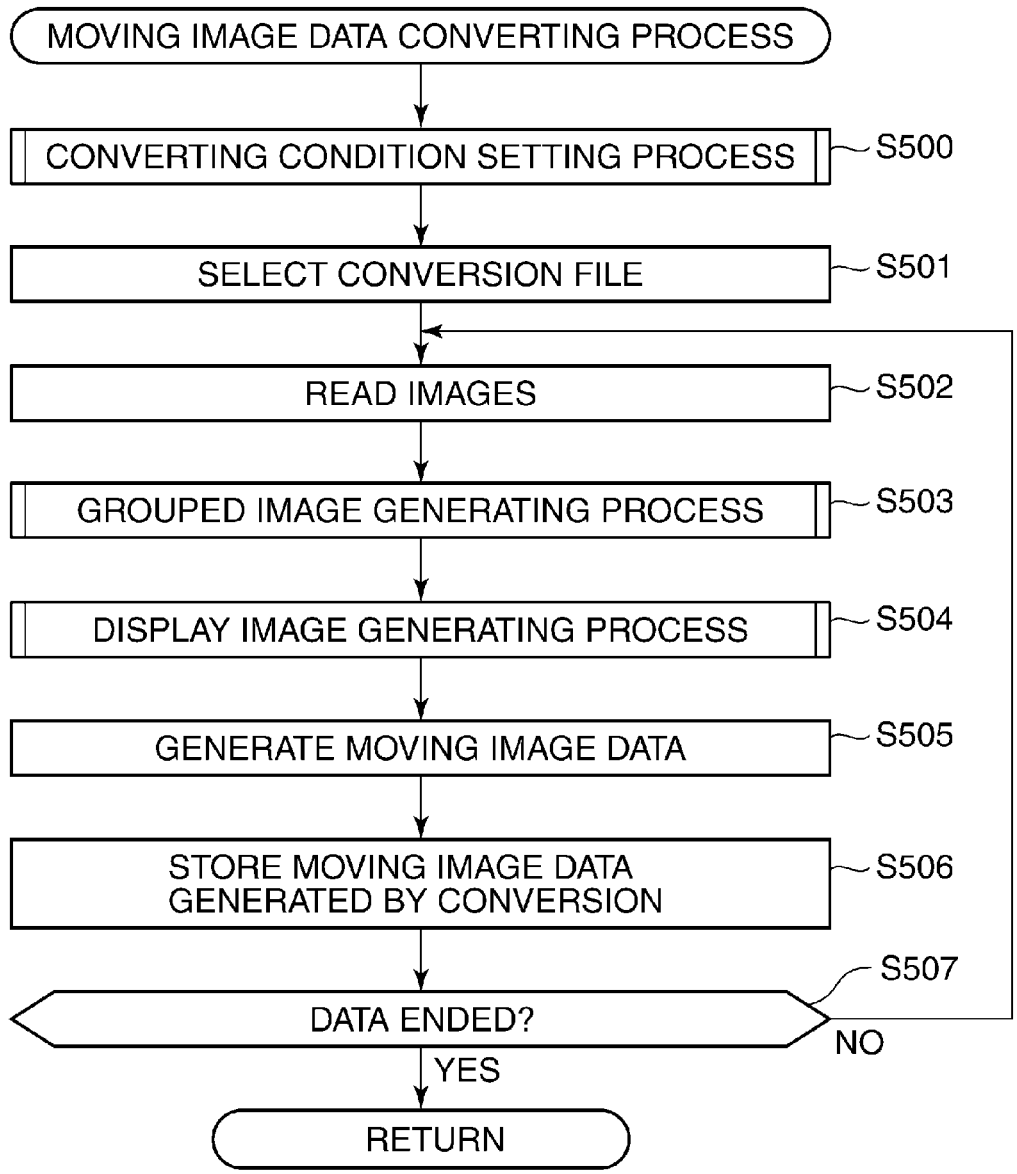
FIG. 15 is a flowchart of a moving image data converting process according to a second embodiment.

FIG. 15 is a flowchart of a moving image data converting process according to the second embodiment. This process is a process in which data recorded in advance is read and converted to moving image data.

First, in step S500, the processor 112 carries out a moving image data converting condition setting process (to be described later with reference to FIG. 16), and then, in step S501, the processor 112 selects a file for use in conversion. Then, in step S502, the processor 112 sequentially reads selected image data (acquired images IP).

In step S503, the processor 112 carries out the grouped image generating process (described earlier with reference to FIG. 10), and then, in step S504, the processor 112 carries out the display image generating process (described earlier with reference to FIG. 11). Then, in step S505, the processor 112 carries out a moving image data generating process, then, in step S506, the processor 112 stores the generated moving image data.

In step S507, the processor 112 determines whether or not reading of the selected image data has been completed, and when reading of the selected image data has been completed, the processor 112 terminates the moving image data converting process in FIG. 15. On the other hand, when in the step S507, reading of the selected image data has not been completed, the processor 112 returns to the step S502, in which it continues to convert moving image data.

Figure 16:
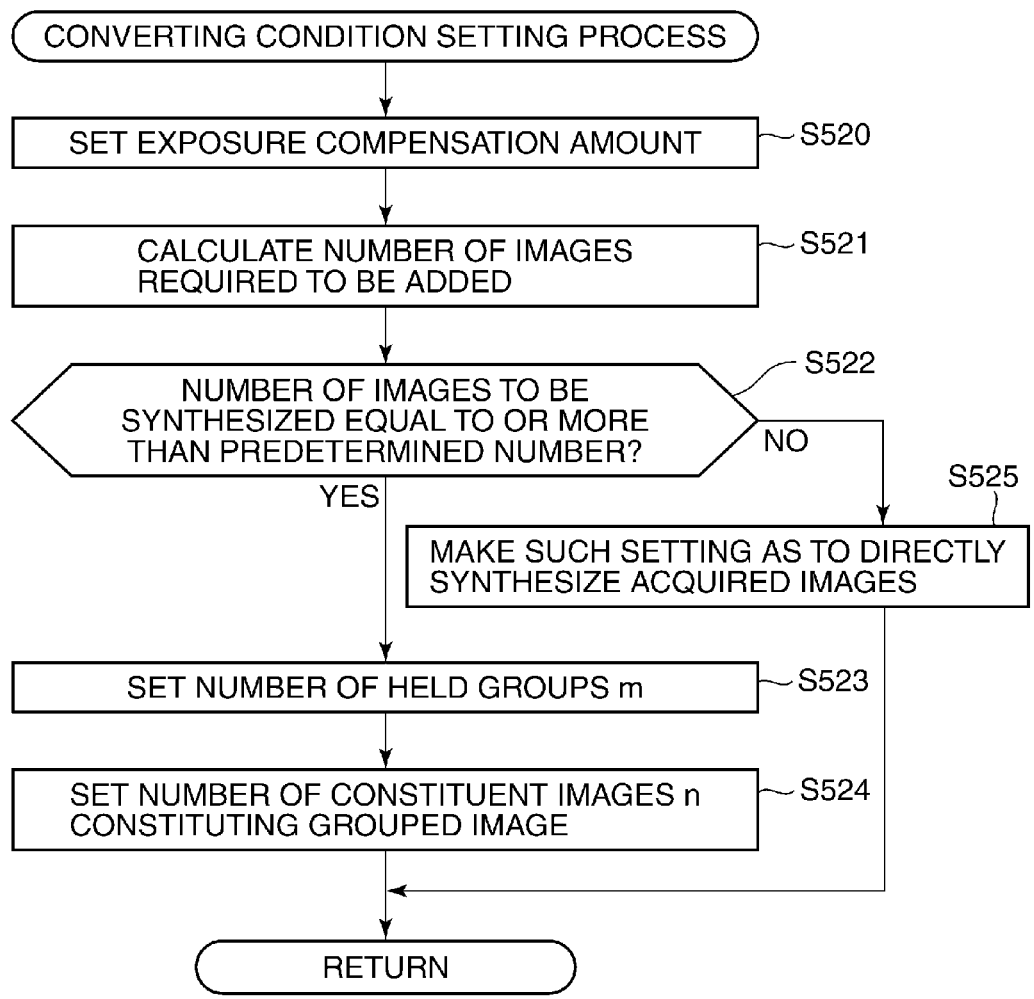
FIG. 16 is a flowchart of a moving image data converting condition setting process carried out in step S500 in FIG. 15.

FIG. 16 is a flowchart of the moving image data converting condition setting process carried out in the step S500 in FIG. 15.

First, in step S520, the processor 112 sets an exposure compensation amount for data to be converted, and then, in step S521, the processor 112 calculates the number of images required to generate an image (the number of images required to be added) based on the set exposure compensation amount.

Then, in step S522, the processor 112 determines whether or not the number of images to be synthesized is equal to or more than a predetermined value. When, as a result of the determination, the number of images to be synthesized is equal to or more than a predetermined value, the processor 112 proceeds to step S523, and on the other hand, when the number of images to be synthesized is more than the predetermined value, the processor 112 proceeds to step S525.

In the steps S523 and S524, the processor 112 sets the number of held groups m and the number of constituent images n in the same manner as in the steps S1430 and S1440 in FIG. 5. In the step S525, the processor 112 makes a setting such as to directly synthesize acquired images IP as in the step S1450. After the steps S524 and S515, the processor 112 terminates the present process.

According to the present embodiment, because even for data acquired in advance, images are grouped into a plurality of groups and synthesized according to compensation values, the computation load associated with synthesis of acquired images can be reduced. It should be noted that for acquired images, the number of held groups m, the number of constituent images n, the number of images to be added p may be defined in place of exposure conditions according to brightness setting conditions such as luminance of the acquired images.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252864 filed Nov. 11, 2010, which is hereby incorporated by reference herein in its entirety.

What is claimed is:

1. An image processing apparatus comprising:
a first holding unit configured to hold a first set number of acquired images that are sequentially acquired;
a first synthesis unit configured to sequentially synthesize the first set number of newly held acquired images to generate first composite images;
a second holding unit configured to sequentially hold the first composite images;
a second synthesis unit configured to synthesize images from an image generated last to an image corresponding to a second set number among the first composite images held in said second holding unit to generate a second composite image; and
a generating unit configured to generate moving image data using the second composite images based on a moving image format,
wherein said second holding unit is capable of further holding a generating condition for use in generating the first composite image, and
wherein when said second holding unit holds the generation condition, said second synthesis unit generates the second composite image based on a synthesis condition determined with consideration given to the generating condition, the generating condition comprising a plurality of ISO sensitivities.

2. The image processing apparatus according to claim 1, further comprising a display unit configured to, every time a new second composite image is generated by said second synthesis unit, update display to the latest second composite image.

3. The image processing apparatus comprising:
an image processing apparatus according to claim 2; and
an image pickup unit configured to acquire acquired images to be held in said first holding unit of the image processing apparatus,
wherein a display unit of the image processing apparatus sequentially displays the second composite images generated by said second synthesis unit as live views.

4. The image pickup apparatus according to claim 3,
wherein said second holding unit is capable of further holding a generating condition for use in generating the first composite image, and
wherein when said second holding unit holds the generation condition, said second synthesis unit generates the second composite image based on a synthesis condition determined with consideration given to the generating condition.

5. The image processing apparatus according to claim 1, further comprising a deleting unit configured to sequentially delete the acquired images used to generate the first composite images, wherein every time the first set number of acquired images are held in said first holding unit, said first synthesis unit synthesizes the first set number of acquired images to generate the first composite images, and in response to said first synthesis unit generating the first composite images, said deleting unit deletes the acquired images used for generation of the first composite images from said first holding unit.

6. The image processing apparatus according to claim 1, in a case where there is no free space when the new first composite images are to be held, said second holding unit replaces the oldest one of the first composite images being held with the new first composite images, and holds the new first composite images.

7. The image processing apparatus according to claim 1, further comprising a first setting unit configured to set the first set number based on a brightness of the acquired images.

8. The image processing apparatus according to claim 7, wherein the brightness of the acquired images corresponds to an exposure time when the acquired images are acquired by image pickup.

9. The image processing apparatus according to claim 1, further comprising a detecting unit configured to detect motion vectors of the acquired images, and a first setting unit configured to set the first set number based on the motion vectors detected by said detecting unit.

10. The image processing apparatus according to claim 1, further comprising a second setting unit configured to set the second setting number based on a brightness set for the second composite image and the first setting number.

11. The image processing apparatus according to claim 1, further comprising a detecting unit configured to detect motion vectors of the acquired images,
wherein said first synthesis unit excludes an image whose degree of matching with other acquired images among the acquired images used for synthesis is smaller than a predetermined value, and carries out synthesis.

12. A control method for an image processing apparatus having a first holding unit configured to hold acquired images, a synthesis unit configured to synthesize a plurality of acquired images to generate first composite images, comprising:
   a first holding step of storing, in the holding unit, a first set number of acquired images there are sequentially acquired;
   a first synthesis step in which the synthesis unit generates first composite images by sequentially synthesizing the first set number of newly held acquired images;
   a second holding step of sequentially holding the first composite images in the holding unit;
   a second synthesis step of synthesizing images from an image generated last to an image corresponding to a second set number among the first composite images held in said second holding step to generate a second composite image; and
   a generating step of generating moving image data using the second composite images based on a moving image format,
   wherein said second holding step is capable of further holding a generating condition for use in generating the first composite image, and
   wherein when said second holding step holds the generation condition, said second synthesis step generates the second composite image based on a synthesis condition determined with consideration given to the generating condition, the generating condition comprising a plurality of ISO sensitivities.

13. The method according to claim 12, further comprising a deleting step of sequentially deleting the acquired images used to generate the first composite images,
   wherein every time the first set number of acquired images are held in said holding unit, said first synthesis step synthesizes the first set number of acquired images to generate the first composite images, and in response to said first synthesis step generating the first composite images, said deleting step deletes the acquired images used for generation of the first composite images from said holding unit.

* * * * *